(12) United States Patent
Liao et al.

(10) Patent No.: US 10,698,175 B2
(45) Date of Patent: Jun. 30, 2020

(54) OPTICAL IMAGING LENS

(71) Applicant: Genius Electronic Optical (Xiamen) Co., Ltd., Xiamen (CN)

(72) Inventors: Huabin Liao, Xiamen (CN); Wenbin Lin, Xiamen (CN); Hai Lin, Xiamen (CN)

(73) Assignee: Genius Electronic Optical (Xiamen) Co., Ltd., Xiamen, Fujian (CN)

( * ) Notice: Subject to any disclaimer, the term of this patent is extended or adjusted under 35 U.S.C. 154(b) by 197 days.

(21) Appl. No.: 16/043,311

(22) Filed: Jul. 24, 2018

(65) Prior Publication Data

US 2019/0377158 A1 Dec. 12, 2019

(30) Foreign Application Priority Data

Jun. 8, 2018 (CN) .......................... 2018 1 0586060

(51) Int. Cl.
*G02B 9/34* (2006.01)
*G02B 7/10* (2006.01)
*G02B 13/02* (2006.01)
*G02B 27/00* (2006.01)

(52) U.S. Cl.
CPC ................ *G02B 9/34* (2013.01); *G02B 7/10* (2013.01); *G02B 13/02* (2013.01); *G02B 27/0037* (2013.01)

(58) Field of Classification Search
CPC .............. G02B 13/004; G02B 13/0045; G02B 13/0065; G02B 13/02; G02B 27/0037; G02B 3/04; G02B 7/10; G02B 9/34
See application file for complete search history.

(56) References Cited

U.S. PATENT DOCUMENTS

RE46,747 E * 3/2018 Hsu

* cited by examiner

*Primary Examiner* — Joseph P Martinez
*Assistant Examiner* — Vipin Patel
(74) *Attorney, Agent, or Firm* — Huffman Law Group, PC

(57) ABSTRACT

An optical imaging lens may include a first, a second, a third, and a fourth lens elements positioned in an order from an object side to an image side along an optical axis. Through designing concave and/or convex surfaces of the four lens elements, the optical imaging lens may provide improved imaging quality and optical characteristics, and have the ability to cooperate the demand of present smaller-sized electronic product while the optical imaging lens may satisfy TTL/TL≥1.700 and EFL/ImgH≥2.500, wherein a distance from the object-side surface of the first lens element to an image plane along the optical axis is represented by TTL, a distance from the object-side surface of the first lens element to the image-side surface of the fourth lens element along the optical axis is represented by TL, an effective focal length of the optical imaging lens is represented by EFL, and an image height of the optical imaging lens is represented by ImgH.

20 Claims, 34 Drawing Sheets

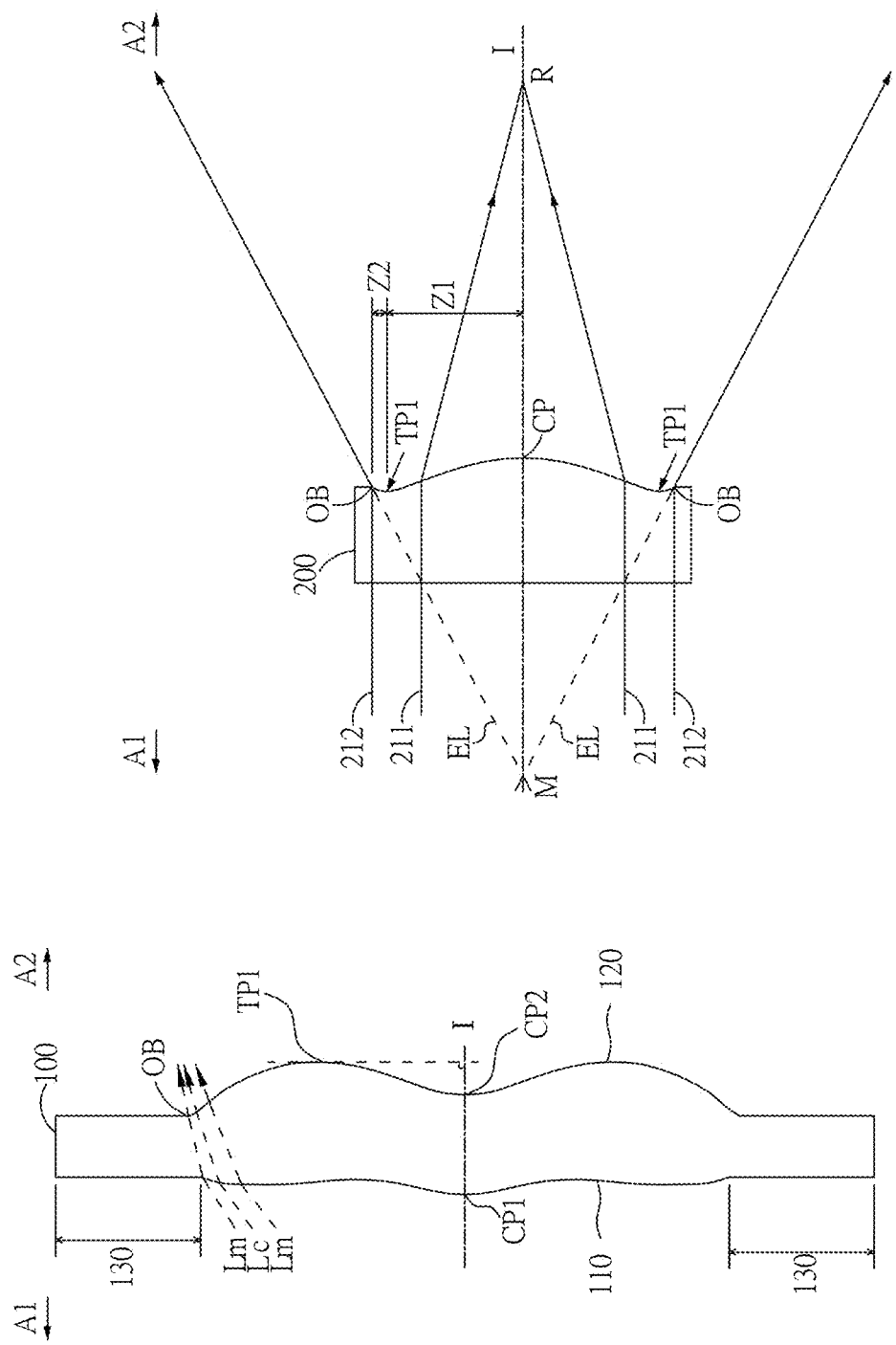

| Embodiment 1 |||||||
| --- |||||||
| EFL = 9.687 mm ; HFOV = 14.502 degrees ; TTL = 11.535 mm |||||||
| Fno = 2.200 ; ImageHeight = 2.520 mm |||||||
| Surface # | | Radius (mm) | Thickness /air gap(mm) | Refractive index | Abbe number | Focal lenght(mm) | Material |
| | Object | INFINITY | Nagative Infinity | | | | |
| R1 | 1st reflective element | INFINITY | 3.000 | | | | |
| STO | Aperture stop | INFINITY | -0.896 | | | | |
| L1A1 | 1st lens element | 3.052 | 1.239 | 1.545 | 55.987 | 5.285 | Plastic |
| L1A2 | | -45.626 | 0.211 | | | | |
| L2A1 | 2nd lens element | 4.537 | 0.754 | 1.661 | 20.412 | -7.848 | Plastic |
| L2A2 | | 2.269 | 2.116 | | | | |
| L3A1 | 3rd lens element | -1.839 | 0.611 | 1.545 | 55.987 | -546.519 | Plastic |
| L3A2 | | -2.068 | 0.130 | | | | |
| L4A1 | 4th lens element | 7.590 | 1.022 | 1.545 | 55.987 | 1115.836 | Plastic |
| L4A2 | | 7.320 | 0.100 | | | | |
| R2A1 | 2nd reflective element | INFINITY | 2.000 | 1.954 | 32.319 | | |
| R2A2 | | INFINITY | -2.000 | | | | |
| R2A3 | | INFINITY | -1.040 | | | | |
| TFA1 | Filtering unit | INFINITY | -0.210 | 1.517 | 64.167 | | |
| TFA2 | | INFINITY | -0.101 | | | | |
| IMA | Image plane | INFINITY | | | | | |

FIG 8

| Embodiment 1 | | | | |
|---|---|---|---|---|
| Aspherical Parameters | | | | |
| Surface # | K | $a_2$ | $a_4$ | $a_6$ | $a_8$ |
| L1A1 | 0.000000E+00 | 0.000000E+00 | -3.235806E-04 | -1.305794E-04 | 9.850482E-05 |
| L1A2 | 0.000000E+00 | 0.000000E+00 | -3.235541E-03 | 3.926123E-03 | -2.115148E-03 |
| L2A1 | 0.000000E+00 | 0.000000E+00 | -1.352563E-02 | 5.044439E-03 | -2.695184E-03 |
| L2A2 | 0.000000E+00 | 0.000000E+00 | -1.336674E-02 | 3.657949E-03 | -3.598687E-03 |
| L3A1 | 0.000000E+00 | 0.000000E+00 | 7.279990E-02 | -2.705508E-02 | 2.411660E-02 |
| L3A2 | 0.000000E+00 | 0.000000E+00 | 2.399214E-02 | 1.348863E-02 | -7.806196E-03 |
| L4A1 | 0.000000E+00 | 0.000000E+00 | -6.572564E-02 | 2.935952E-02 | -1.481032E-02 |
| L4A2 | 0.000000E+00 | 0.000000E+00 | -5.050058E-02 | 1.407478E-02 | -4.580795E-03 |
| Surface # | $a_{10}$ | $a_{12}$ | $a_{14}$ | $a_{16}$ | |
| L1A1 | -5.547365E-05 | 1.386391E-05 | -1.948475E-06 | 1.101214E-07 | |
| L1A2 | 6.999721E-04 | -1.422895E-04 | 1.622100E-05 | -7.882839E-07 | |
| L2A1 | 1.017187E-03 | -2.392231E-04 | 3.361594E-05 | -2.155454E-06 | |
| L2A2 | 3.066699E-03 | -1.563909E-03 | 4.537475E-04 | -5.437477E-05 | |
| L3A1 | -1.422866E-02 | 6.271741E-03 | -1.533960E-03 | 1.586753E-04 | |
| L3A2 | 3.906975E-03 | -9.401528E-04 | 1.653790E-04 | -1.720758E-05 | |
| L4A1 | 5.805443E-03 | -1.397385E-03 | 1.967294E-04 | -1.258027E-05 | |
| L4A2 | 1.203220E-03 | -2.102154E-04 | 2.158928E-05 | -9.479403E-07 | |

FIG 9

| Embodiment 2 ||||||||
| EFL = 9.585 mm ; HFOV = 14.537 degrees ; TTL = 11.426 mm ||||||||
| Fno = 2.200 ; ImageHeight = 2.520 mm ||||||||
| Surface # | | Radius (mm) | Thickness /air gap(mm) | Refractive index | Abbe number | Focal lenght(mm) | Material |
| --- | --- | --- | --- | --- | --- | --- | --- |
| | Object | INFINITY | Nagative Infinity | | | | |
| R1 | 1st reflective element | INFINITY | 3.000 | | | | |
| STO | Aperture stop | INFINITY | -0.805 | | | | |
| L1A1 | 1st lens element | 3.176 | 1.643 | 1.545 | 55.987 | 5.531 | Plastic |
| L1A2 | | -50.871 | 0.100 | | | | |
| L2A1 | 2nd lens element | 4.758 | 0.775 | 1.661 | 20.412 | -7.667 | Plastic |
| L2A2 | | 2.304 | 1.543 | | | | |
| L3A1 | 3rd lens element | -1.867 | 0.427 | 1.545 | 55.987 | -230.201 | Plastic |
| L3A2 | | -2.048 | 0.100 | | | | |
| L4A1 | 4th lens element | 3.342 | 0.617 | 1.545 | 55.987 | 70.122 | Plastic |
| L4A2 | | 3.423 | 0.698 | | | | |
| R2A1 | 2nd reflective element | INFINITY | 1.955 | 1.954 | 32.319 | | |
| R2A2 | | INFINITY | -1.955 | | | | |
| R2A3 | | INFINITY | -1.040 | | | | |
| TFA1 | Filtering unit | INFINITY | -0.210 | 1.517 | 64.167 | | |
| TFA2 | | INFINITY | -0.365 | | | | |
| IMA | Image plane | INFINITY | | | | | |

FIG 12

| Embodiment 2 | | | | | |
|---|---|---|---|---|---|
| Aspherical Parameters | | | | | |
| Surface # | K | $a_2$ | $a_4$ | $a_6$ | $a_8$ |
| L1A1 | 0.000000E+00 | 0.000000E+00 | -3.481756E-04 | -4.617721E-05 | -8.359355E-05 |
| L1A2 | 0.000000E+00 | 0.000000E+00 | 6.255439E-04 | 7.909449E-04 | -4.938725E-04 |
| L2A1 | 0.000000E+00 | 0.000000E+00 | -9.044636E-03 | 1.512007E-03 | -5.626170E-05 |
| L2A2 | 0.000000E+00 | 0.000000E+00 | -1.295978E-02 | 1.790813E-03 | -4.261769E-04 |
| L3A1 | 0.000000E+00 | 0.000000E+00 | 1.032539E-01 | -6.255797E-02 | 5.242574E-02 |
| L3A2 | 0.000000E+00 | 0.000000E+00 | 5.118215E-02 | -8.695235E-03 | 7.867116E-03 |
| L4A1 | 0.000000E+00 | 0.000000E+00 | -8.694155E-02 | 4.060402E-02 | -1.863452E-02 |
| L4A2 | 0.000000E+00 | 0.000000E+00 | -7.624517E-02 | 2.917336E-02 | -1.199808E-02 |
| Surface # | $a_{10}$ | $a_{12}$ | $a_{14}$ | $a_{16}$ | |
| L1A1 | 4.094274E-05 | -1.534092E-05 | 2.640624E-06 | -2.059375E-07 | |
| L1A2 | 1.288446E-04 | -2.334830E-05 | 2.306629E-06 | -1.226175E-07 | |
| L2A1 | -6.078002E-05 | 3.325064E-05 | -7.105613E-06 | 4.981935E-07 | |
| L2A2 | 1.205618E-03 | -7.641514E-04 | 2.713283E-04 | -3.681525E-05 | |
| L3A1 | -2.654543E-02 | 9.155551E-03 | -1.849630E-03 | 1.669268E-04 | |
| L3A2 | -2.084736E-03 | 3.759981E-04 | -2.385906E-05 | -3.722287E-06 | |
| L4A1 | 6.602910E-03 | -1.594523E-03 | 2.323251E-04 | -1.559860E-05 | |
| L4A2 | 3.734880E-03 | -7.812884E-04 | 9.618806E-05 | -5.317478E-06 | |

FIG 13

| Embodiment 3 | | | | | | | |
|---|---|---|---|---|---|---|---|
| EFL = 6.302 mm ; HFOV = 21.047 degrees ; TTL = 8.110 mm | | | | | | | |
| Fno = 2.200 ; ImageHeight = 2.520 mm | | | | | | | |
| Surface # | | Radius (mm) | Thickness /air gap(mm) | Refractive index | Abbe number | Focal lenght(mm) | Material |
| | Object | INFINITY | Nagative Infinity | | | | |
| R1 | 1st reflective element | INFINITY | 3.000 | | | | |
| STO | Aperture stop | INFINITY | -0.539 | | | | |
| L1A1 | 1st lens element | 2.127 | 0.841 | 1.545 | 55.987 | 3.574 | Plastic |
| L1A2 | | -20.448 | 0.378 | | | | |
| L2A1 | 2nd lens element | 2.369 | 0.220 | 1.661 | 20.412 | -5.369 | Plastic |
| L2A2 | | 1.373 | 0.830 | | | | |
| L3A1 | 3rd lens element | -1.424 | 0.293 | 1.545 | 55.987 | 29.741 | Plastic |
| L3A2 | | -1.405 | 0.122 | | | | |
| L4A1 | 4th lens element | 1.962 | 0.267 | 1.545 | 55.987 | -37.057 | Plastic |
| L4A2 | | 1.702 | 0.107 | | | | |
| R2A1 | 2nd reflective element | INFINITY | 2.000 | 1.954 | 32.319 | | |
| R2A2 | | INFINITY | -2.000 | | | | |
| R2A3 | | INFINITY | -0.740 | | | | |
| TFA1 | Filtering unit | INFINITY | -0.210 | 1.517 | 64.167 | | |
| TFA2 | | INFINITY | -0.103 | | | | |
| IMA | Image plane | INFINITY | | | | | |

FIG 16

| Embodiment 3 | | | | | |
|---|---|---|---|---|---|
| Aspherical Parameters | | | | | |
| Surface # | K | $a_2$ | $a_4$ | $a_6$ | $a_8$ |
| L1A1 | 0.000000E+00 | 0.000000E+00 | 2.868640E-05 | 2.303220E-03 | -5.811170E-03 |
| L1A2 | 0.000000E+00 | 0.000000E+00 | 2.495172E-02 | -1.834449E-02 | 1.342761E-02 |
| L2A1 | 0.000000E+00 | 0.000000E+00 | -4.962237E-02 | 1.201293E-03 | -2.367950E-03 |
| L2A2 | 0.000000E+00 | 0.000000E+00 | -8.812090E-02 | -1.078596E-02 | 7.350417E-02 |
| L3A1 | 0.000000E+00 | 0.000000E+00 | 2.089514E-01 | -2.803891E-01 | 5.413102E-01 |
| L3A2 | 0.000000E+00 | 0.000000E+00 | 8.479519E-02 | 5.921637E-02 | -1.156016E-02 |
| L4A1 | 0.000000E+00 | 0.000000E+00 | -4.155572E-01 | 4.284964E-01 | -3.694375E-01 |
| L4A2 | 0.000000E+00 | 0.000000E+00 | -4.002364E-01 | 3.522466E-01 | -2.852561E-01 |
| Surface # | $a_{10}$ | $a_{12}$ | $a_{14}$ | $a_{16}$ | |
| L1A1 | 6.015351E-03 | -3.312588E-03 | 9.602834E-04 | -1.171432E-04 | |
| L1A2 | -6.285078E-03 | 1.672846E-03 | -2.350586E-04 | 1.330993E-05 | |
| L2A1 | 4.085978E-02 | -5.045127E-02 | 2.212809E-02 | -3.245362E-03 | |
| L2A2 | -1.178227E-01 | 1.481074E-01 | -1.071034E-01 | 2.870902E-02 | |
| L3A1 | -5.031108E-01 | 3.219889E-01 | -1.312986E-01 | 2.348780E-02 | |
| L3A2 | 3.880340E-02 | -2.322516E-03 | -1.780052E-02 | 5.831089E-03 | |
| L4A1 | 2.246330E-01 | -8.825928E-02 | 1.999914E-02 | -1.976857E-03 | |
| L4A2 | 1.607903E-01 | -5.943663E-02 | 1.269462E-02 | -1.206496E-03 | |

FIG 17

| Embodiment 4 |||||||
|---|---|---|---|---|---|---|
| EFL = 12.238 mm ; HFOV = 11.709 degrees ; TTL = 14.001 mm<br>Fno = 2.933 ; ImageHeight = 2.520 mm |||||||
| Surface # | | Radius (mm) | Thickness /air gap(mm) | Refractive index | Abbe number | Focal lenght(mm) | Material |
| | Object | INFINITY | Nagative Infinity | | | | |
| R1 | 1st reflective element | INFINITY | 3.500 | | | | |
| STO | Aperture stop | INFINITY | -0.533 | | | | |
| L1A1 | 1st lens element | 4.003 | 1.397 | 1.545 | 55.987 | 8.020 | Plastic |
| L1A2 | | 40.648 | 0.693 | | | | |
| L2A1 | 2nd lens element | 16.748 | 0.941 | 1.661 | 20.412 | -11.448 | Plastic |
| L2A2 | | 5.128 | 1.586 | | | | |
| L5A1 | 5th lens element | 2.140 | 0.493 | 1.545 | 55.987 | 35.981 | Plastic |
| L5A2 | | 2.206 | 1.570 | | | | |
| L3A1 | 3rd lens element | -1.962 | 0.389 | 1.545 | 55.987 | -234.588 | Plastic |
| L3A2 | | -2.132 | 0.246 | | | | |
| L4A1 | 4th lens element | 5.366 | 0.684 | 1.545 | 55.987 | -254.496 | Plastic |
| L4A2 | | 4.934 | 0.126 | | | | |
| R2A1 | 2nd reflective element | INFINITY | 1.955 | 1.954 | 32.319 | | |
| R2A2 | | INFINITY | -1.955 | | | | |
| R2A3 | | INFINITY | -0.488 | | | | |
| TFA1 | Filtering unit | INFINITY | -0.210 | 1.517 | 64.167 | | |
| TFA2 | | INFINITY | -1.269 | | | | |
| IMA | Image plane | INFINITY | | | | | |

FIG 20

| Embodiment 4 | | | | |
|---|---|---|---|---|
| Aspherical Parameters | | | | |
| Surface # | K | $a_2$ | $a_4$ | $a_6$ | $a_8$ |
| L1A1 | 0.000000E+00 | 0.000000E+00 | -8.293013E-04 | -1.764907E-04 | -2.512165E-05 |
| L1A2 | 0.000000E+00 | 0.000000E+00 | -2.093265E-05 | -1.383542E-03 | 5.809359E-04 |
| L2A1 | 0.000000E+00 | 0.000000E+00 | 3.333072E-03 | -2.974425E-03 | 1.928205E-03 |
| L2A2 | 0.000000E+00 | 0.000000E+00 | 2.872679E-03 | -2.615746E-03 | 2.650790E-03 |
| L3A1 | 0.000000E+00 | 0.000000E+00 | -1.819044E-02 | -5.866710E-03 | 2.407470E-03 |
| L3A2 | 0.000000E+00 | 0.000000E+00 | -1.919032E-02 | -9.574995E-03 | 4.807519E-03 |
| L4A1 | 0.000000E+00 | 0.000000E+00 | 8.971842E-02 | -6.477416E-02 | 4.951500E-02 |
| L4A2 | 0.000000E+00 | 0.000000E+00 | 4.095153E-02 | -2.324491E-02 | 2.165730E-02 |
| L5A1 | 0.000000E+00 | 0.000000E+00 | -1.006733E-01 | 2.492651E-02 | 6.634658E-04 |
| L5A2 | 0.000000E+00 | 0.000000E+00 | -8.552194E-02 | 2.605676E-02 | -7.278453E-03 |
| Surface # | $a_{10}$ | $a_{12}$ | $a_{14}$ | $a_{16}$ | |
| L1A1 | 2.150514E-05 | -7.513092E-06 | 1.166441E-06 | -7.369075E-08 | |
| L1A2 | -1.339844E-04 | 1.297015E-05 | 3.426511E-07 | -1.239104E-07 | |
| L2A1 | -6.822716E-04 | 1.360948E-04 | -1.385132E-05 | 4.757178E-07 | |
| L2A2 | -1.191914E-03 | 2.904664E-04 | -3.639882E-05 | 1.529090E-06 | |
| L3A1 | -5.382670E-04 | -7.130508E-05 | 2.571157E-05 | -2.015317E-06 | |
| L3A2 | -1.263010E-03 | -9.280512E-05 | 4.957096E-05 | -1.776293E-06 | |
| L4A1 | -2.222632E-02 | 6.109904E-03 | -9.720915E-04 | 7.476292E-05 | |
| L4A2 | -8.472413E-03 | 1.566871E-03 | -6.565649E-05 | -8.688879E-06 | |
| L5A1 | -4.226932E-03 | 1.701081E-03 | -2.871117E-04 | 1.786540E-05 | |
| L5A2 | 1.287119E-03 | -1.036909E-04 | -1.946553E-06 | 6.009535E-07 | |

FIG 21

| Embodiment 5 ||||||||
| :---: | :---: | :---: | :---: | :---: | :---: | :---: | :---: |
| EFL = 12.462 mm ; HFOV = 11.457 degrees ; TTL = 13.977 mm ||||||||
| Fno = 2.987 ; ImageHeight = 2.520 mm ||||||||
| Surface # | | Radius (mm) | Thickness /air gap(mm) | Refractive index | Abbe number | Focal lenght(mm) | Material |
| | Object | INFINITY | Nagative Infinity | | | | |
| R1 | 1st reflective element | INFINITY | 3.500 | | | | |
| STO | Aperture stop | INFINITY | -0.728 | | | | |
| L1A1 | 1st lens element | 3.185 | 1.397 | 1.545 | 55.987 | 6.716 | Plastic |
| L1A2 | | 20.443 | 0.086 | | | | |
| L2A1 | 2nd lens element | 9.717 | 0.333 | 1.661 | 20.412 | -13.284 | Plastic |
| L2A2 | | 4.572 | 0.070 | | | | |
| L5A1 | 5th lens element | 2.420 | 0.369 | 1.661 | 20.412 | -47.267 | Plastic |
| L5A2 | | 2.111 | 2.420 | | | | |
| L3A1 | 3rd lens element | -1.861 | 0.543 | 1.545 | 55.987 | -51.821 | Plastic |
| L3A2 | | -2.197 | 0.070 | | | | |
| L4A1 | 4th lens element | 3.721 | 0.471 | 1.545 | 55.987 | 37.278 | Plastic |
| L4A2 | | 4.349 | 0.638 | | | | |
| R2A1 | 2nd reflective element | INFINITY | 1.955 | 1.954 | 32.319 | | |
| R2A2 | | INFINITY | -1.955 | | | | |
| R2A3 | | INFINITY | -0.941 | | | | |
| TFA1 | Filtering unit | INFINITY | -0.210 | 1.517 | 64.167 | | |
| TFA2 | | INFINITY | -2.521 | | | | |
| IMA | Image plane | INFINITY | | | | | |

FIG 24

| Embodiment 5 ||||||
|---|---|---|---|---|---|
| Aspherical Parameters ||||||
| Surface # | K | $a_2$ | $a_4$ | $a_6$ | $a_8$ |
| L1A1 | 0.000000E+00 | 0.000000E+00 | -2.132649E-04 | -2.975795E-04 | 1.409672E-04 |
| L1A2 | 0.000000E+00 | 0.000000E+00 | 3.448464E-03 | -6.813609E-04 | -1.056498E-03 |
| L2A1 | 0.000000E+00 | 0.000000E+00 | 1.528275E-02 | -1.967673E-03 | -3.491538E-03 |
| L2A2 | 0.000000E+00 | 0.000000E+00 | -1.179702E-02 | 8.511162E-03 | -8.429621E-03 |
| L3A1 | 0.000000E+00 | 0.000000E+00 | -4.715387E-02 | -2.346939E-04 | 3.261874E-03 |
| L3A2 | 0.000000E+00 | 0.000000E+00 | -2.511494E-02 | -1.317381E-02 | 1.338843E-02 |
| L4A1 | 0.000000E+00 | 0.000000E+00 | 8.041806E-02 | -6.055351E-02 | 5.303076E-02 |
| L4A2 | 0.000000E+00 | 0.000000E+00 | 2.443432E-02 | -9.963443E-03 | 1.496351E-02 |
| L5A1 | 0.000000E+00 | 0.000000E+00 | -9.937454E-02 | 3.301564E-02 | -4.418243E-03 |
| L5A2 | 0.000000E+00 | 0.000000E+00 | -8.011250E-02 | 2.264905E-02 | -4.495432E-03 |
| Surface # | $a_{10}$ | $a_{12}$ | $a_{14}$ | $a_{16}$ | |
| L1A1 | -6.060540E-05 | 1.320600E-05 | -1.762452E-06 | 4.555755E-08 | |
| L1A2 | 9.269709E-04 | -3.540290E-04 | 6.304776E-05 | -4.356715E-06 | |
| L2A1 | 3.055072E-03 | -1.070913E-03 | 1.842778E-04 | -1.265121E-05 | |
| L2A2 | 6.567437E-03 | -2.397854E-03 | 4.542684E-04 | -3.626641E-05 | |
| L3A1 | 1.383942E-03 | -1.280393E-03 | 3.306765E-04 | -3.348589E-05 | |
| L3A2 | -5.015147E-03 | 8.366399E-04 | -3.057343E-05 | -1.295020E-05 | |
| L4A1 | -2.802509E-02 | 9.457286E-03 | -1.775674E-03 | 1.464633E-04 | |
| L4A2 | -8.397507E-03 | 2.547983E-03 | -3.657166E-04 | 1.814977E-05 | |
| L5A1 | -3.058894E-03 | 1.676661E-03 | -3.269231E-04 | 2.298854E-05 | |
| L5A2 | -4.425321E-04 | 4.504583E-04 | -9.172748E-05 | 6.284685E-06 | |

FIG 25

| Embodiment 6 |||||||
|---|---|---|---|---|---|---|
| EFL = 11.846 mm；HFOV = 12.186 degrees；TTL = 14.000 mm |||||||
| Fno = 2.839；ImageHeight = 2.520 mm |||||||
| Surface # | | Radius (mm) | Thickness /air gap(mm) | Refractive index | Abbe number | Focal lenght(mm) | Material |
| | Object | INFINITY | Nagative Infinity | | | | |
| R1 | 1st reflective element | INFINITY | 3.500 | | | | |
| STO | Aperture stop | INFINITY | -0.532 | | | | |
| L1A1 | 1st lens element | 3.991 | 1.397 | 1.545 | 55.987 | 7.649 | Plastic |
| L1A2 | | 77.854 | 0.949 | | | | |
| L2A1 | 2nd lens element | 14.289 | 0.904 | 1.661 | 20.412 | -10.277 | Plastic |
| L2A2 | | 4.516 | 1.555 | | | | |
| L5A1 | 5th lens element | 2.120 | 0.422 | 1.545 | 55.987 | 35.331 | Plastic |
| L5A2 | | 2.214 | 1.324 | | | | |
| L3A1 | 3rd lens element | -2.009 | 0.394 | 1.545 | 55.987 | -413.576 | Plastic |
| L3A2 | | -2.168 | 0.197 | | | | |
| L4A1 | 4th lens element | 5.558 | 0.857 | 1.545 | 55.987 | -158.734 | Plastic |
| L4A2 | | 4.939 | 0.113 | | | | |
| R2A1 | 2nd reflective element | INFINITY | 2.373 | 1.954 | 32.319 | | |
| R2A2 | | INFINITY | -2.373 | | | | |
| R2A3 | | INFINITY | -0.100 | | | | |
| TFA1 | Filtering unit | INFINITY | -0.210 | 1.517 | 64.167 | | |
| TFA2 | | INFINITY | -0.831 | | | | |
| IMA | Image plane | INFINITY | | | | | |

FIG 28

| Embodiment 6 | | | | | |
|---|---|---|---|---|---|
| Aspherical Parameters | | | | | |
| Surface # | K | $a_2$ | $a_4$ | $a_6$ | $a_8$ |
| L1A1 | 0.000000E+00 | 0.000000E+00 | -9.207305E-04 | -1.300319E-04 | -3.241681E-05 |
| L1A2 | 0.000000E+00 | 0.000000E+00 | -7.172621E-04 | -5.523020E-04 | 1.643269E-04 |
| L2A1 | 0.000000E+00 | 0.000000E+00 | 1.767337E-03 | -1.589177E-03 | 1.056999E-03 |
| L2A2 | 0.000000E+00 | 0.000000E+00 | 2.690926E-03 | -1.607509E-03 | 1.725815E-03 |
| L3A1 | 0.000000E+00 | 0.000000E+00 | -1.499971E-02 | -7.321615E-03 | 3.348429E-03 |
| L3A2 | 0.000000E+00 | 0.000000E+00 | -1.458725E-02 | -1.220033E-02 | 6.672728E-03 |
| L4A1 | 0.000000E+00 | 0.000000E+00 | 9.695466E-02 | -7.395569E-02 | 5.602820E-02 |
| L4A2 | 0.000000E+00 | 0.000000E+00 | 3.927780E-02 | -2.560615E-02 | 2.416413E-02 |
| L5A1 | 0.000000E+00 | 0.000000E+00 | -9.680381E-02 | 2.474515E-02 | -2.064304E-04 |
| L5A2 | 0.000000E+00 | 0.000000E+00 | -7.615264E-02 | 2.210290E-02 | -6.268525E-03 |
| Surface # | $a_{10}$ | $a_{12}$ | $a_{14}$ | $a_{16}$ | |
| L1A1 | 1.540820E-05 | -5.067791E-06 | 7.476049E-07 | -4.929565E-08 | |
| L1A2 | -2.786658E-05 | -8.939890E-07 | 8.456277E-07 | -8.577253E-08 | |
| L2A1 | -3.756630E-04 | 7.429038E-05 | -7.128422E-06 | 1.757161E-07 | |
| L2A2 | -7.153306E-04 | 1.462524E-04 | -1.028388E-05 | -6.527972E-07 | |
| L3A1 | -1.277190E-03 | 2.603366E-04 | -5.029884E-05 | 4.574111E-06 | |
| L3A2 | -2.801047E-03 | 6.934095E-04 | -1.553508E-04 | 1.865153E-05 | |
| L4A1 | -2.576697E-02 | 7.354937E-03 | -1.196481E-03 | 8.860976E-05 | |
| L4A2 | -1.019110E-02 | 2.206474E-03 | -1.832831E-04 | -4.644853E-07 | |
| L5A1 | -3.855035E-03 | 1.608416E-03 | -2.846647E-04 | 1.910913E-05 | |
| L5A2 | 1.199052E-03 | -1.315916E-04 | 5.358984E-06 | 1.374821E-07 | |

FIG 29

| Embodiment 7 |||||||||
|---|---|---|---|---|---|---|---|
| EFL = 14.654 mm ; HFOV = 9.856 degrees ; TTL = 16.973 mm |||||||||
| Fno = 3.512 ; ImageHeight = 2.520 mm |||||||||
| Surface # | | Radius (mm) | Thickness /air gap(mm) | Refractive index | Abbe number | Focal lenght(mm) | Material |
| | Object | INFINITY | Nagative Infinity | | | | |
| R1 | 1st reflective element | INFINITY | 3.500 | | | | |
| STO | Aperture stop | INFINITY | -0.380 | | | | |
| L1A1 | 1st lens element | 5.223 | 1.397 | 1.545 | 55.987 | 10.322 | Plastic |
| L1A2 | | 64.215 | 1.197 | | | | |
| L2A1 | 2nd lens element | 71.276 | 1.528 | 1.661 | 20.412 | -14.032 | Plastic |
| L2A2 | | 8.204 | 1.767 | | | | |
| L5A1 | 5th lens element | 2.261 | 0.599 | 1.545 | 55.987 | 35.262 | Plastic |
| L5A2 | | 2.322 | 1.998 | | | | |
| L3A1 | 3rd lens element | -2.085 | 0.466 | 1.545 | 55.987 | -236.957 | Plastic |
| L3A2 | | -2.286 | 0.189 | | | | |
| L4A1 | 4th lens element | 6.558 | 0.842 | 1.545 | 55.987 | 146.144 | Plastic |
| L4A2 | | 6.820 | 0.287 | | | | |
| R2A1 | 2nd reflective element | INFINITY | 1.955 | 1.954 | 32.319 | | |
| R2A2 | | INFINITY | -1.955 | | | | |
| R2A3 | | INFINITY | -0.502 | | | | |
| TFA1 | Filtering unit | INFINITY | -0.210 | 1.517 | 64.167 | | |
| TFA2 | | INFINITY | -2.082 | | | | |
| IMA | Image plane | INFINITY | | | | | |

FIG 32

| Embodiment 7 |||||| 
|---|---|---|---|---|---|
| Aspherical Parameters ||||||
| Surface # | K | $a_2$ | $a_4$ | $a_6$ | $a_8$ |
| L1A1 | 0.000000E+00 | 0.000000E+00 | -1.027669E-03 | -1.343233E-04 | -2.529474E-05 |
| L1A2 | 0.000000E+00 | 0.000000E+00 | -1.174552E-03 | -5.291887E-04 | 1.299366E-04 |
| L2A1 | 0.000000E+00 | 0.000000E+00 | 1.971278E-03 | -1.328107E-03 | 6.981623E-04 |
| L2A2 | 0.000000E+00 | 0.000000E+00 | 1.354993E-03 | -1.567666E-03 | 1.293000E-03 |
| L3A1 | 0.000000E+00 | 0.000000E+00 | -1.652970E-02 | -5.427484E-03 | 1.963649E-03 |
| L3A2 | 0.000000E+00 | 0.000000E+00 | -1.791933E-02 | -9.005095E-03 | 4.625739E-03 |
| L4A1 | 0.000000E+00 | 0.000000E+00 | 9.258606E-02 | -6.723580E-02 | 4.870580E-02 |
| L4A2 | 0.000000E+00 | 0.000000E+00 | 3.507669E-02 | -3.066284E-02 | 2.903377E-02 |
| L5A1 | 0.000000E+00 | 0.000000E+00 | -9.197196E-02 | 1.128682E-02 | 1.120595E-02 |
| L5A2 | 0.000000E+00 | 0.000000E+00 | -6.909933E-02 | 1.739138E-02 | -3.354150E-03 |
| Surface # | $a_{10}$ | $a_{12}$ | $a_{14}$ | $a_{16}$ | |
| L1A1 | 1.886391E-05 | -6.122585E-06 | 9.273173E-07 | -5.625275E-08 | |
| L1A2 | -5.027706E-06 | -6.938659E-06 | 1.759868E-06 | -1.404601E-07 | |
| L2A1 | -2.121523E-04 | 3.597473E-05 | -2.598766E-06 | -1.963788E-08 | |
| L2A2 | -5.457561E-04 | 1.316283E-04 | -1.682810E-05 | 7.422004E-07 | |
| L3A1 | -5.343086E-04 | 2.553135E-05 | 6.255101E-06 | -1.092615E-06 | |
| L3A2 | -1.612972E-03 | 2.403579E-04 | -1.705991E-05 | 6.076185E-07 | |
| L4A1 | -2.134062E-02 | 5.800086E-03 | -8.928498E-04 | 6.078946E-05 | |
| L4A2 | -1.296513E-02 | 3.243613E-03 | -4.144144E-04 | 2.061212E-05 | |
| L5A1 | -8.699561E-03 | 2.787712E-03 | -4.270328E-04 | 2.551644E-05 | |
| L5A2 | 1.407930E-04 | 1.001756E-04 | -2.146754E-05 | 1.375998E-06 | |

FIG 33

| Embodiment 8 | | | | | | |
|---|---|---|---|---|---|---|
| EFL = 14.749 mm ; HFOV = 9.843 degrees ; TTL = 17.675 mm | | | | | | |
| Fno = 3.535 ; ImageHeight = 2.520 mm | | | | | | |
| Surface # | | Radius (mm) | Thickness /air gap(mm) | Refractive index | Abbe number | Focal lenght(mm) | Material |
| | Object | INFINITY | Nagative Infinity | | | | |
| R1 | 1st reflective element | INFINITY | 3.500 | | | | |
| STO | Aperture stop | INFINITY | -0.356 | | | | |
| L1A1 | 1st lens element | 5.484 | 1.397 | 1.545 | 55.987 | 10.624 | Plastic |
| L1A2 | | 90.601 | 1.606 | | | | |
| L2A1 | 2nd lens element | 75.975 | 1.674 | 1.661 | 20.412 | -13.344 | Plastic |
| L2A2 | | 7.899 | 1.649 | | | | |
| L5A1 | 5th lens element | 2.269 | 0.629 | 1.545 | 55.987 | 34.552 | Plastic |
| L5A2 | | 2.326 | 1.860 | | | | |
| L3A1 | 3rd lens element | -2.106 | 0.459 | 1.545 | 55.987 | -210.133 | Plastic |
| L3A2 | | -2.310 | 0.219 | | | | |
| L4A1 | 4th lens element | 6.173 | 0.904 | 1.545 | 55.987 | 75.040 | Plastic |
| L4A2 | | 6.892 | 0.214 | | | | |
| R2A1 | 2nd reflective element | INFINITY | 2.450 | 1.954 | 32.319 | | |
| R2A2 | | INFINITY | -2.450 | | | | |
| R2A3 | | INFINITY | -0.388 | | | | |
| TFA1 | Filtering unit | INFINITY | -0.210 | 1.517 | 64.167 | | |
| TFA2 | | INFINITY | -1.567 | | | | |
| IMA | Image plane | INFINITY | | | | | |

FIG 36

| Embodiment 8 |||||
|---|---|---|---|---|
| Aspherical Parameters |||||
| Surface # | K | $a_2$ | $a_4$ | $a_6$ | $a_8$ |
| L1A1 | 0.000000E+00 | 0.000000E+00 | -1.189635E-03 | -7.952256E-05 | -3.394754E-05 |
| L1A2 | 0.000000E+00 | 0.000000E+00 | -1.793094E-03 | -1.539699E-04 | 1.101056E-06 |
| L2A1 | 0.000000E+00 | 0.000000E+00 | 6.785088E-04 | -4.754962E-04 | 3.276580E-04 |
| L2A2 | 0.000000E+00 | 0.000000E+00 | 2.512182E-04 | -6.472996E-04 | 8.588836E-04 |
| L3A1 | 0.000000E+00 | 0.000000E+00 | -1.577618E-02 | -4.706777E-03 | 1.750975E-03 |
| L3A2 | 0.000000E+00 | 0.000000E+00 | -1.652258E-02 | -8.628554E-03 | 4.474139E-03 |
| L4A1 | 0.000000E+00 | 0.000000E+00 | 9.062553E-02 | -6.574186E-02 | 4.631398E-02 |
| L4A2 | 0.000000E+00 | 0.000000E+00 | 3.382522E-02 | -2.942407E-02 | 2.649297E-02 |
| L5A1 | 0.000000E+00 | 0.000000E+00 | -8.716434E-02 | 1.094939E-02 | 9.020188E-03 |
| L5A2 | 0.000000E+00 | 0.000000E+00 | -6.516661E-02 | 1.563869E-02 | -2.965453E-03 |
| Surface # | $a_{10}$ | $a_{12}$ | $a_{14}$ | $a_{16}$ ||
| L1A1 | 1.687552E-05 | -4.936616E-06 | 7.091567E-07 | -4.211787E-08 ||
| L1A2 | 1.768599E-05 | -7.889061E-06 | 1.416606E-06 | -9.848320E-08 ||
| L2A1 | -1.099087E-04 | 1.915481E-05 | -1.269506E-06 | -4.493763E-08 ||
| L2A2 | -4.156297E-04 | 1.085729E-04 | -1.496999E-05 | 7.079553E-07 ||
| L3A1 | -5.110732E-04 | 2.936832E-05 | 5.460916E-06 | -1.089230E-06 ||
| L3A2 | -1.636645E-03 | 2.624504E-04 | -2.315077E-05 | 1.207996E-06 ||
| L4A1 | -1.977152E-02 | 5.236227E-03 | -7.900456E-04 | 5.319547E-05 ||
| L4A2 | -1.121949E-02 | 2.649439E-03 | -3.165807E-04 | 1.450293E-05 ||
| L5A1 | -6.837179E-03 | 2.097640E-03 | -3.061690E-04 | 1.736590E-05 ||
| L5A2 | 1.718210E-04 | 6.066443E-05 | -1.333859E-05 | 8.228645E-07 ||

FIG 37

| Embodiment 9 | | | | | | | |
|---|---|---|---|---|---|---|---|
| EFL = 9.136 mm ; HFOV = 15.453 degrees ; TTL = 11.358 mm | | | | | | | |
| Fno = 2.189 ; ImageHeight = 2.520 mm | | | | | | | |
| Surface # | | Radius (mm) | Thickness /air gap(mm) | Refractive index | Abbe number | Focal lenght(mm) | Material |
| | Object | INFINITY | Nagative Infinity | | | | |
| R1 | 1st reflective element | INFINITY | 3.500 | | | | |
| STO | Aperture stop | INFINITY | -0.829 | | | | |
| L1A1 | 1st lens element | 2.951 | 1.410 | 1.545 | 55.987 | 5.353 | Plastic |
| L1A2 | | -272.655 | 0.481 | | | | |
| L2A1 | 2nd lens element | 5.521 | 0.379 | 1.661 | 20.412 | -7.380 | Plastic |
| L2A2 | | 2.531 | 0.295 | | | | |
| L5A1 | 5th lens element | 2.921 | 0.316 | 1.545 | 55.987 | 65.363 | Plastic |
| L5A2 | | 3.060 | 1.087 | | | | |
| L3A1 | 3rd lens element | -1.847 | 0.807 | 1.545 | 55.987 | 75.186 | Plastic |
| L3A2 | | -2.040 | 0.230 | | | | |
| L4A1 | 4th lens element | 3.960 | 0.674 | 1.545 | 55.987 | 462.203 | Plastic |
| L4A2 | | 3.781 | 0.107 | | | | |
| R2A1 | 2nd reflective element | INFINITY | 1.955 | 1.954 | 32.319 | | |
| R2A2 | | INFINITY | -1.955 | | | | |
| R2A3 | | INFINITY | -0.500 | | | | |
| TFA1 | Filtering unit | INFINITY | -0.210 | 1.517 | 64.167 | | |
| TFA2 | | INFINITY | -0.952 | | | | |
| IMA | Image plane | INFINITY | | | | | |

FIG 40

| Embodiment 9 | | | | | |
|---|---|---|---|---|---|
| Aspherical Parameters | | | | | |
| Surface # | K | $a_2$ | $a_4$ | $a_6$ | $a_8$ |
| L1A1 | 0.000000E+00 | 0.000000E+00 | 4.038080E-04 | 1.136299E-04 | -3.256324E-04 |
| L1A2 | 0.000000E+00 | 0.000000E+00 | 5.424122E-03 | -5.463864E-03 | 3.049098E-03 |
| L2A1 | 0.000000E+00 | 0.000000E+00 | -8.046014E-03 | -1.310236E-02 | 8.952831E-03 |
| L2A2 | 0.000000E+00 | 0.000000E+00 | -1.445863E-02 | -1.685858E-02 | 1.364871E-02 |
| L3A1 | 0.000000E+00 | 0.000000E+00 | -1.395067E-02 | -1.667168E-02 | 1.338834E-02 |
| L3A2 | 0.000000E+00 | 0.000000E+00 | -1.072599E-02 | -1.589232E-02 | 1.329174E-02 |
| L4A1 | 0.000000E+00 | 0.000000E+00 | 5.040794E-02 | -3.326957E-02 | 2.844272E-02 |
| L4A2 | 0.000000E+00 | 0.000000E+00 | -2.730474E-03 | 2.317446E-02 | -1.176617E-02 |
| L5A1 | 0.000000E+00 | 0.000000E+00 | -1.088237E-01 | 4.441898E-02 | -1.850260E-02 |
| L5A2 | 0.000000E+00 | 0.000000E+00 | -9.453133E-02 | 2.941801E-02 | -9.645857E-03 |
| Surface # | $a_{10}$ | $a_{12}$ | $a_{14}$ | $a_{16}$ | |
| L1A1 | 2.068488E-04 | -7.376836E-05 | 1.296122E-05 | -9.309126E-07 | |
| L1A2 | -1.242087E-03 | 3.252732E-04 | -4.712490E-05 | 2.799182E-06 | |
| L2A1 | -3.803169E-03 | 1.286483E-03 | -2.695583E-04 | 2.386872E-05 | |
| L2A2 | -7.357102E-03 | 3.333657E-03 | -8.844012E-04 | 9.421495E-05 | |
| L3A1 | -7.443069E-03 | 3.340785E-03 | -8.721809E-04 | 9.194378E-05 | |
| L3A2 | -7.473380E-03 | 3.332693E-03 | -8.754489E-04 | 9.695066E-05 | |
| L4A1 | -1.480932E-02 | 6.699220E-03 | -1.850660E-03 | 2.146855E-04 | |
| L4A2 | 4.890847E-03 | -5.959125E-04 | -8.446828E-05 | 2.128399E-05 | |
| L5A1 | 6.524541E-03 | -1.623173E-03 | 2.376377E-04 | -1.481004E-05 | |
| L5A2 | 2.583360E-03 | -5.148350E-04 | 6.306989E-05 | -3.383391E-06 | |

FIG 41

| Embodiment 10 | | | | | | | |
|---|---|---|---|---|---|---|---|
| EFL = 9.130 mm ; HFOV = 16.452 degrees ; TTL = 11.330 mm | | | | | | | |
| Fno = 2.188 ; ImageHeight = 2.520 mm | | | | | | | |
| Surface # | | Radius (mm) | Thickness /air gap(mm) | Refractive index | Abbe number | Focal lenght(mm) | Material |
| | Object | INFINITY | Nagative Infinity | | | | |
| R1 | 1st reflective element | INFINITY | 3.500 | | | | |
| STO | Aperture stop | INFINITY | -0.829 | | | | |
| L1A1 | 1st lens element | 2.911 | 1.431 | 1.545 | 55.987 | 5.316 | Plastic |
| L1A2 | | -1111.467 | 0.488 | | | | |
| L2A1 | 2nd lens element | 5.740 | 0.369 | 1.661 | 20.412 | -7.306 | Plastic |
| L2A2 | | 2.568 | 0.273 | | | | |
| L5A1 | 5th lens element | 3.046 | 0.305 | 1.661 | 20.412 | 24.339 | Plastic |
| L5A2 | | 3.112 | 1.118 | | | | |
| L3A1 | 3rd lens element | -1.810 | 0.798 | 1.545 | 55.987 | 68.418 | Plastic |
| L3A2 | | -1.995 | 0.217 | | | | |
| L4A1 | 4th lens element | 4.014 | 0.654 | 1.545 | 55.987 | 377.177 | Plastic |
| L4A2 | | 3.858 | 0.107 | | | | |
| R2A1 | 2nd reflective element | INFINITY | 1.955 | 1.954 | 32.319 | | |
| R2A2 | | INFINITY | -1.955 | | | | |
| R2A3 | | INFINITY | -1.040 | | | | |
| TFA1 | Filtering unit | INFINITY | -0.210 | 1.517 | 64.167 | | |
| TFA2 | | INFINITY | -0.411 | | | | |
| IMA | Image plane | INFINITY | | | | | |

FIG 44

| Embodiment 10 | | | | |
|---|---|---|---|---|
| Aspherical Parameters | | | | |
| Surface # | K | $a_2$ | $a_4$ | $a_6$ | $a_8$ |
| L1A1 | 0.000000E+00 | 0.000000E+00 | 3.610897E-04 | 8.495068E-05 | -3.295925E-04 |
| L1A2 | 0.000000E+00 | 0.000000E+00 | 5.265575E-03 | -5.485386E-03 | 3.022935E-03 |
| L2A1 | 0.000000E+00 | 0.000000E+00 | -7.709649E-03 | -1.294270E-02 | 8.969043E-03 |
| L2A2 | 0.000000E+00 | 0.000000E+00 | -1.526202E-02 | -1.704092E-02 | 1.364428E-02 |
| L3A1 | 0.000000E+00 | 0.000000E+00 | -1.428534E-02 | -1.689028E-02 | 1.330069E-02 |
| L3A2 | 0.000000E+00 | 0.000000E+00 | -9.678110E-03 | -1.529232E-02 | 1.337005E-02 |
| L4A1 | 0.000000E+00 | 0.000000E+00 | 5.046950E-02 | -3.294290E-02 | 2.862622E-02 |
| L4A2 | 0.000000E+00 | 0.000000E+00 | -2.460975E-03 | 2.291690E-02 | -1.164238E-02 |
| L5A1 | 0.000000E+00 | 0.000000E+00 | -1.088310E-01 | 4.464663E-02 | -1.846468E-02 |
| L5A2 | 0.000000E+00 | 0.000000E+00 | -9.421123E-02 | 2.952308E-02 | -9.653317E-03 |
| Surface # | $a_{10}$ | $a_{12}$ | $a_{14}$ | $a_{16}$ | |
| L1A1 | 2.072428E-04 | -7.377624E-05 | 1.285628E-05 | -9.678574E-07 | |
| L1A2 | -1.245333E-03 | 3.260538E-04 | -4.758449E-05 | 2.851628E-06 | |
| L2A1 | -3.810347E-03 | 1.285179E-03 | -2.682262E-04 | 2.383048E-05 | |
| L2A2 | -7.325646E-03 | 3.343325E-03 | -8.841786E-04 | 8.710830E-05 | |
| L3A1 | -7.496084E-03 | 3.317818E-03 | -8.808350E-04 | 8.754466E-05 | |
| L3A2 | -7.494429E-03 | 3.298013E-03 | -8.872230E-04 | 1.018737E-04 | |
| L4A1 | -1.469426E-02 | 6.741443E-03 | -1.839441E-03 | 2.085185E-04 | |
| L4A2 | 4.917034E-03 | -5.889807E-04 | -8.381495E-05 | 2.092774E-05 | |
| L5A1 | 6.523594E-03 | -1.622403E-03 | 2.379273E-04 | -1.489297E-05 | |
| L5A2 | 2.589409E-03 | -5.148400E-04 | 6.292643E-05 | -3.344129E-06 | |

FIG 45

| Embodiment | 1st | 2nd | 3rd |
|---|---|---|---|
| T1 | 1.239 | 1.643 | 0.841 |
| G12 | 0.211 | 0.100 | 0.378 |
| T2 | 0.754 | 0.775 | 0.220 |
| G23 | 2.116 | 1.543 | 0.830 |
| T3 | 0.611 | 0.427 | 0.293 |
| G34 | 0.130 | 0.100 | 0.122 |
| T4 | 1.022 | 0.617 | 0.267 |
| G4F | 5.140 | 5.647 | 4.847 |
| TTF | 0.210 | 0.210 | 0.210 |
| GFP | 0.101 | 0.365 | 0.103 |
| TTL | 11.535 | 11.426 | 8.110 |
| BFL | 5.451 | 6.222 | 5.160 |
| EFL | 9.687 | 9.585 | 6.302 |
| TL | 6.084 | 5.204 | 2.950 |
| ALT | 3.626 | 3.461 | 1.620 |
| AAG | 2.458 | 1.743 | 1.330 |
| ImagH | 2.520 | 2.520 | 2.520 |
| TTL/TL | 1.896 | 2.196 | 2.749 |
| EFL/ImgH | 3.844 | 3.804 | 2.501 |
| ALT/(T1+G12) | 2.500 | 1.986 | 1.329 |
| AAG/(T3+T4) | 1.505 | 1.669 | 2.378 |
| BFL/(T1+T4) | 2.411 | 2.754 | 4.659 |
| EFL/BFL | 1.777 | 1.541 | 1.221 |
| BFL/(T1+T2+T3) | 2.093 | 2.187 | 3.813 |
| AAG/(T2+T3) | 1.800 | 1.450 | 2.595 |
| T4/T2 | 1.355 | 0.796 | 1.213 |
| TL/(G12+G23) | 2.614 | 3.168 | 2.441 |
| AAG/(T1+G34) | 1.795 | 1.000 | 1.382 |
| AAG/(G34+T4) | 2.134 | 2.431 | 3.424 |
| BFL/(G23+T3) | 1.998 | 3.158 | 4.596 |
| ALT/AAG | 1.476 | 1.986 | 1.218 |
| ALT/(T2+T3) | 2.656 | 2.880 | 3.161 |
| G23/T4 | 2.072 | 2.501 | 3.111 |
| T1/T4 | 1.213 | 2.663 | 3.151 |
| EFL/AAG | 3.942 | 5.501 | 4.738 |

FIG 46A

| Embodiment | 4th | 5th | 6th | 7th | 8th | 9th | 10th |
|---|---|---|---|---|---|---|---|
| T1 | 1.397 | 1.397 | 1.397 | 1.397 | 1.397 | 1.410 | 1.431 |
| G12 | 0.693 | 0.086 | 0.949 | 1.197 | 1.606 | 0.481 | 0.488 |
| T2 | 0.941 | 0.333 | 0.904 | 1.528 | 1.674 | 0.379 | 0.369 |
| G25 | 1.586 | 0.070 | 1.555 | 1.767 | 1.649 | 0.295 | 0.273 |
| T5 | 0.493 | 0.369 | 0.422 | 0.599 | 0.629 | 0.316 | 0.305 |
| G53 | 1.570 | 2.420 | 1.324 | 1.998 | 1.860 | 1.087 | 1.118 |
| T3 | 0.389 | 0.543 | 0.394 | 0.466 | 0.459 | 0.807 | 0.798 |
| G34 | 0.246 | 0.070 | 0.197 | 0.189 | 0.219 | 0.230 | 0.217 |
| T4 | 0.684 | 0.471 | 0.857 | 0.842 | 0.904 | 0.674 | 0.654 |
| G4F | 4.522 | 5.487 | 4.959 | 4.698 | 5.502 | 4.516 | 5.056 |
| TTF | 0.210 | 0.210 | 0.210 | 0.210 | 0.210 | 0.210 | 0.210 |
| GFP | 1.269 | 2.521 | 0.831 | 2.082 | 1.567 | 0.952 | 0.411 |
| TTL | 14.001 | 13.977 | 14.000 | 16.973 | 17.675 | 11.358 | 11.330 |
| G23 | 3.649 | 2.859 | 3.302 | 4.364 | 4.137 | 1.698 | 1.696 |
| BFL | 6.001 | 8.218 | 6.000 | 6.990 | 7.279 | 5.678 | 5.678 |
| EFL | 12.238 | 12.462 | 11.846 | 14.654 | 14.749 | 9.136 | 9.130 |
| TL | 8.000 | 5.759 | 8.000 | 9.984 | 10.397 | 5.681 | 5.653 |
| ALT | 3.904 | 3.113 | 3.974 | 4.833 | 5.062 | 3.587 | 3.557 |
| AAG | 4.096 | 2.645 | 4.026 | 5.150 | 5.334 | 2.093 | 2.096 |
| ImagH | 2.520 | 2.520 | 2.520 | 2.520 | 2.520 | 2.520 | 2.520 |
| TTL/TL | 1.750 | 2.427 | 1.750 | 1.700 | 1.700 | 1.999 | 2.004 |
| EFL/ImgH | 4.856 | 4.945 | 4.701 | 5.815 | 5.853 | 3.625 | 3.623 |
| ALT/(T1+G12) | 1.868 | 2.100 | 1.694 | 1.863 | 1.685 | 1.896 | 1.854 |
| AAG/(T3+T4) | 3.817 | 2.609 | 3.217 | 3.935 | 3.916 | 1.413 | 1.443 |
| BFL/(T1+T4) | 2.884 | 4.399 | 2.662 | 3.121 | 3.164 | 2.724 | 2.723 |
| EFL/BFL | 2.039 | 1.516 | 1.974 | 2.097 | 2.026 | 1.609 | 1.608 |
| BFL/(T1+T2+T3) | 2.200 | 3.615 | 2.226 | 2.061 | 2.062 | 2.187 | 2.186 |
| AAG/(T2+T3) | 3.078 | 3.019 | 3.101 | 2.583 | 2.501 | 1.765 | 1.796 |
| T4/T2 | 0.726 | 1.414 | 0.948 | 0.551 | 0.540 | 1.778 | 1.772 |
| TL/(G12+G23) | 1.842 | 1.956 | 1.882 | 1.795 | 1.810 | 2.607 | 2.589 |
| AAG/(T1+G34) | 2.492 | 1.804 | 2.525 | 3.247 | 3.300 | 1.276 | 1.272 |
| AAG/(G34+T4) | 4.403 | 4.894 | 3.819 | 4.993 | 4.751 | 2.314 | 2.405 |
| BFL/(G23+T3) | 1.486 | 2.416 | 1.623 | 1.447 | 1.584 | 2.267 | 2.277 |
| ALT/AAG | 0.953 | 1.177 | 0.987 | 0.938 | 0.949 | 1.714 | 1.697 |
| ALT/(T2+T3) | 2.934 | 3.554 | 3.061 | 2.424 | 2.373 | 3.024 | 3.048 |
| G23/T4 | 5.337 | 6.071 | 3.853 | 5.180 | 4.579 | 2.517 | 2.592 |
| T1/T4 | 2.043 | 2.967 | 1.630 | 1.659 | 1.546 | 2.091 | 2.187 |
| EFL/AAG | 2.988 | 4.711 | 2.943 | 2.845 | 2.765 | 4.364 | 4.356 |

FIG 46B

OPTICAL IMAGING LENS

CROSS-REFERENCE TO RELATED APPLICATIONS

This application claims priority to P.R.C. Patent Application No. 201810586060.4 titled "Optical Imaging Lens," filed on Jun. 8, 2018, with the State Intellectual Property Office of the People's Republic of China (SIPO).

TECHNICAL FIELD

The present disclosure relates to an optical imaging lens, and particularly, to an optical imaging lens having at least four lens elements.

BACKGROUND

In recent years, portable electronic devices have thinned down and the design of optical imaging lens could no longer meet the demand for compact devices. Decreasing the dimensions of an optical lens while maintaining good optical performance might not be achieved simply by scaling down the lens. Rather, these benefits may be realized by improving other aspects of the design process, such as by varying the material used for the lens or adjusting the assembly yield. Moreover, maintaining good optical performance is also desired. Therefore, the design of the optical imaging lens should match up with the demand for slim design of current electronic devices while maintaining good optical performance that is also the industry's goal.

Achieving these advancements may entail overcoming unique challenges, even when compared to designing improvements for traditional optical lenses. However, refining aspects of the optical lens manufacturing process that result in a lens that meets consumer demand and provides upgrades to imaging quality continues to be a desirable objective for industries, governments, and academia.

SUMMARY

The present disclosure provides an optical imaging lens for capturing images and videos such as the optical imaging lens of cell phones, cameras, tablets and personal digital assistants. By controlling the convex or concave shape of the surfaces of lens elements, the length of the optical imaging lens may be realized to match up with the demand for slim design of current electronic devices while maintaining good optical performance and having telescopic function.

In the specification, parameters used herein may include:

| Parameter | Definition |
|---|---|
| T1 | A thickness of the first lens element along the optical axis |
| G12 | A distance from the image-side surface of the first lens element to the object-side surface of the second lens element along the optical axis, i.e., an air gap between the first lens element and the second lens element along the optical axis |
| T2 | A thickness of the second lens element along the optical axis |
| G23 | A distance from the image-side surface of the second lens element to the object-side surface of the third lens element along the optical axis |
| T3 | A thickness of the third lens element along the optical axis |
| G34 | A distance from the image-side surface of the third lens element to the object-side surface of the fourth lens element along the optical axis, i.e., an air gap between the third lens element and the fourth lens element along the optical axis |
| T4 | A thickness of the fourth lens element along the optical axis |
| G4F | A distance from the image-side surface of the fourth lens element to the object-side surface of the filtering unit along the optical axis, i.e., an air gap between the fourth lens element and the filtering unit along the optical axis |
| T5 | A thickness of the fifth lens element along the optical axis |
| G25 | A distance from the image-side surface of the second lens element to the object-side surface of the fifth lens element along the optical axis, i.e., an air gap between the second lens element and the fifth lens element along the optical axis |
| G53 | A distance from the image-side surface of the fifth lens element to the object-side surface of the third lens element along the optical axis, i.e., an air gap between the fifth lens element and the third lens element along the optical axis |
| TTF | A thickness of the filtering unit along the optical axis |
| GFP | A distance from the image-side surface of the filtering unit to the image plane along the optical axis, i.e., an air gap between the filtering unit and the image plane along the optical axis |
| f1 | A focal length of the first lens element |
| f2 | A focal length of the second lens element |
| f3 | A focal length of the third lens element |
| f4 | A focal length of the fourth lens element |
| f5 | A focal length of the fifth lens element |
| n1 | A refractive index of the first lens element |
| n2 | A refractive index of the second lens element |
| n3 | A refractive index of the third lens element |
| n4 | A refractive index of the fourth lens element |
| n5 | A refractive index of the fifth lens element |
| V1 | An Abbe number of the first lens element |
| V2 | An Abbe number of the second lens element |
| V3 | An Abbe number of the third lens element |
| V4 | An Abbe number of the fourth lens element |
| V5 | An Abbe number of the fifth lens element |
| HFOV | Half Field of View of the optical imaging lens |
| Fno | F-number of the optical imaging lens |
| EFL | An effective focal length of the optical imaging lens |
| TTL | A distance from the object-side surface of the first lens element to the image plane along the optical axis, i.e., the length of the optical imaging lens |
| ALT | A sum of the thicknesses of all lens elements having refracting power along the optical axis |
| AAG | A sum of the air gaps among all lens elements having refracting power along the optical axis |
| BFL | A back focal length of the optical imaging lens, i.e., a distance from the image-side surface of the fourth lens element to the image plane along the optical axis (i.e. the sum of G4F, TTF and GFP) |
| TL | A distance from the object-side surface of the first lens element to the image-side surface of the fourth lens element along the optical axis |
| ImgH | An image height of the optical imaging lens |

According to an embodiment of the optical imaging lens of the present disclosure, an optical imaging lens may comprise an aperture stop, a first lens element, a second lens element, a third lens element and a fourth lens element sequentially from an object side to an image side along an optical axis. The first lens element to the fourth lens element may each comprise an object-side surface facing toward the object side and allowing imaging rays to pass through and an image-side surface facing toward the image side and allowing the imaging rays to pass through. The first lens element may be arranged to be a lens element having refracting power in a first order from the object side to the image side along the optical axis. The second lens element may be arranged to be a lens element having refracting power in a second order from the object side to the image side along the optical axis. A periphery region of the object-side surface of the second lens element may be convex. The third lens element may be arranged to be a lens element having refracting power in a second order from the image side to the object side along the optical axis. An optical axis region of the object-side surface of the third lens element may be concave. A periphery region of the image-side surface of the third lens element may be convex. The fourth lens element may be arranged to be a lens element having refracting power in a first order from the image side to the object side along the optical axis. A periphery region of the object-side surface of the fourth lens element may be concave. An optical axis region of the image-side surface of the fourth lens element may be concave. The optical imaging lens may satisfy two Inequalities:

$TTL/TL \geq 1.700$ Inequality (1); and $EFL/ImgH \geq 2.500$ Inequality (2).

In another exemplary embodiment, some Inequalities could be taken into consideration as follows:

$ALT/(T1+G12) \leq 2.700$ Inequality (3);

$AAG/(T3+T4) \geq 1.000$ Inequality (4);

$BFL/(T1+T4) \geq 2.100$ Inequality (5);

$EFL/BFL \leq 2.300$ Inequality (6);

$BFL/(T1+T2+T3) \geq 1.800$ Inequality (7);

$AAG/(T2+T3) \geq 1.400$ Inequality (8);

$T4/T2 \leq 2.000$ Inequality (9);

$TL/(G12+G23) \leq 3.200$ Inequality (10);

$AAG/(T1+G34) \geq 1.000$ Inequality (11);

$AAG/(G34+T4) \geq 2.100$ Inequality (12);

$BFL/(G23+T3) \geq 1.400$ Inequality (13);

$ALT/AAG \leq 2.100$ Inequality (14);

$ALT/(T2+T3) \leq 3.800$ Inequality (15);

$G23/T4 \leq 6.100$ Inequality (16);

$T1/T4 \geq 1.200$ Inequality (17); and $EFL/AAG \leq 5.600$ Inequality (18).

According to another embodiment of the optical imaging lens of the present disclosure, the optical imaging lens may further comprise at least one reflective element, which could fold the imaging rays, such that the optical imaging lens may meet the demand for slimming portable electronic devices.

According to another embodiment of the optical imaging lens of the present disclosure, the optical imaging lens may further comprise a reflective element, which may be disposed between the fourth lens element and an image plane, such that the imaging rays from the fourth lens element may be folded toward the image plane. Alternatively, the reflective element may be disposed between the object side and the first lens element, such that the imaging rays from the object side may be folded toward the first lens element. Accordingly, the optical imaging lens may meet the demand for slimming portable electronic devices.

According to another embodiment of the optical imaging lens of the present disclosure, the optical imaging lens may further comprise a first reflective element and a second reflective element, in which the first reflective element may be disposed between the fourth lens element and an image plane, such that the imaging rays from the fourth lens element may be folded toward the image plane, and the second reflective element may be disposed between the object side and the first lens element, such that the imaging rays from the object side may be folded toward the first lens element. Accordingly, the imaging rays may be folded by the first reflective element and the second reflective element, such that the optical imaging lens may be accommodated in the portable electronic devices readily instead of limiting the system length of the optical imaging lens to realize the goal of slimming portable electronic devices.

In some example embodiments, more details about the convex or concave surface structure, refracting power or chosen material etc. could be incorporated for one specific lens element or broadly for a plurality of lens elements to improve the control for the system performance and/or resolution. It is noted that the details listed here could be incorporated in the example embodiments if no inconsistency occurs.

Through controlling the convex or concave shape of the surfaces and at least one inequality, the optical imaging lens in the example embodiments may achieve the goal of maintaining good imaging quality and matching up with slim portable electronic devices.

BRIEF DESCRIPTION OF THE DRAWINGS

Exemplary embodiments will be more readily understood from the following detailed description when read in conjunction with the appended drawings, in which:

FIG. 1 depicts a cross-sectional view of one single lens element according to one embodiment of the present disclosure;

FIG. 2 depicts a schematic view of a relation between a surface shape and an optical focus of a lens element;

FIG. 8 depicts a table of optical data for each lens element of an optical imaging lens according to the first embodiment of the present disclosure;

FIG. 9 depicts a table of aspherical data of the optical imaging lens according to the first embodiment of the present disclosure;

FIG. 12 depicts a table of optical data for each lens element of the optical imaging lens according to the second embodiment of the present disclosure;

FIG. 13 depicts a table of aspherical data of the optical imaging lens according to the second embodiment of the present disclosure;

FIG. 16 depicts a table of optical data for each lens element of the optical imaging lens according to the third embodiment of the present disclosure;

FIG. 17 depicts a table of aspherical data of the optical imaging lens according to the third embodiment of the present disclosure;

FIG. 20 depicts a table of optical data for each lens element of the optical imaging lens according to the fourth embodiment of the present disclosure;

FIG. 21 depicts a table of aspherical data of the optical imaging lens according to the fourth embodiment of the present disclosure;

FIG. 24 depicts a table of optical data for each lens element of the optical imaging lens according to the fifth embodiment of the present disclosure;

FIG. 25 depicts a table of aspherical data of the optical imaging lens according to the fifth embodiment of the present disclosure;

FIG. 28 depicts a table of optical data for each lens element of the optical imaging lens according to the sixth embodiment of the present disclosure;

FIG. 29 depicts a table of aspherical data of the optical imaging lens according to the sixth embodiment of the present disclosure;

FIG. 32 depicts a table of optical data for each lens element of the optical imaging lens according to the seventh embodiment of the present disclosure;

FIG. 33 depicts a table of aspherical data of the optical imaging lens according to the seventh embodiment of the present disclosure;

FIG. 36 depicts a table of optical data for each lens element of the optical imaging lens according to the eighth embodiment of the present disclosure;

FIG. 37 depicts a table of aspherical data of the optical imaging lens according to the eighth embodiment of the present disclosure;

FIG. 40 depicts a table of optical data for each lens element of the optical imaging lens according to the ninth embodiment of the present disclosure;

FIG. 41 depicts a table of aspherical data of the optical imaging lens according to the ninth embodiment of the present disclosure;

FIG. 44 depicts a table of optical data for each lens element of the optical imaging lens according to the tenth embodiment of the present disclosure;

FIG. 45 depicts a table of aspherical data of the optical imaging lens according to the tenth embodiment of the present disclosure;

FIG. 46A is a table for the values of T1, G12, T2, G23, T3, G34, T4, G4F, TTF, GFP, TTL, BFL, EFL, TL, ALT, AAG, ImgH, TTL/TL, EFL/ImgH, ALT/(T1+G12), AAG/(T3+T4), BFL/(T1+T4), EFL/BFL, BFL/(T1+T2+T3), AAG/(T2+T3), T4/T2, TL/(G12+G23), AAG/(T1+G34), AAG/(G34+T4), BFL/(G23+T3), ALT/AAG, ALT/(T2+T3), G23/T4, T1/T4 and EFL/AAG as determined in the first to third embodiment; and FIG. 46B is a table for the values of T1, G12, T2, G25, T5, G53, T3, G34, T4, G4F, TTF, GFP, TTL, G23, BFL, EFL, TL, ALT, AAG, ImgH, TTL/TL, EFL/ImgH, ALT/(T1+G12), AAG/(T3+T4), BFL/(T1+T4), EFL/BFL, BFL/(T1+T2+T3), AAG/(T2+T3), T4/T2, TL/(G12+G23), AAG/(T1+G34), AAG/(G34+T4), BFL/(G23+T3), ALT/AAG, ALT/(T2+T3), G23/T4, T1/T4 and EFL/AAG as determined in the fourth to tenth embodiment.

DETAILED DESCRIPTION

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
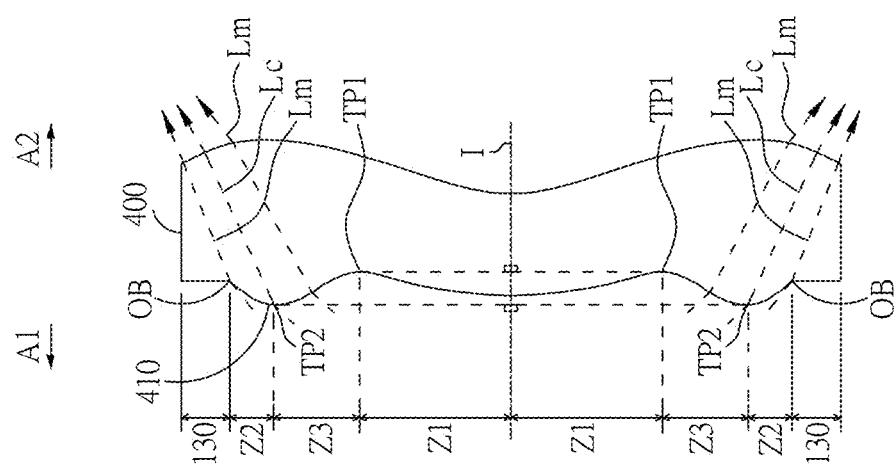
FIG. 4 depicts a schematic view of a second example of a surface shape and an effective radius of a lens element.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 3:
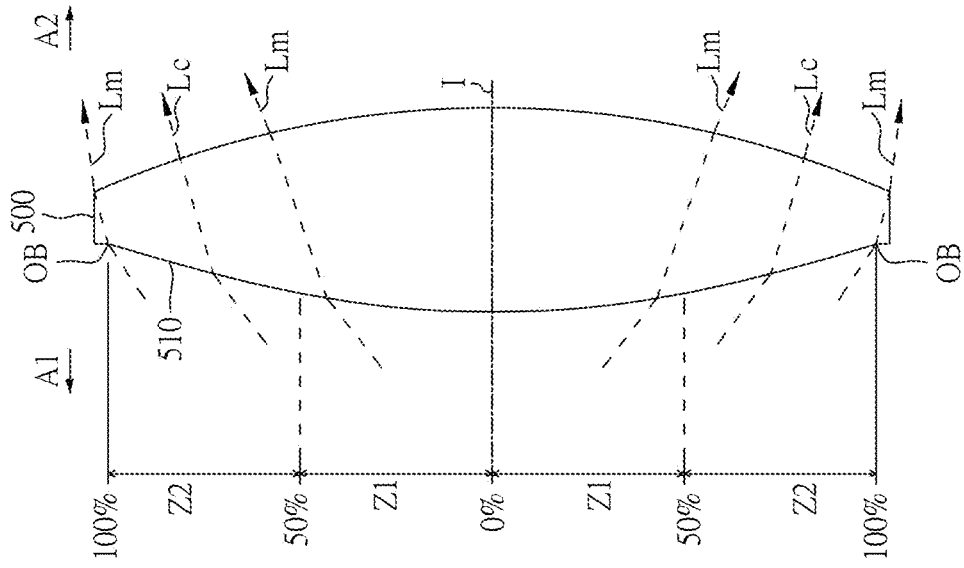
FIG. 3 depicts a schematic view of a first example of a surface shape and an effective radius of a lens element.
Figure 5:
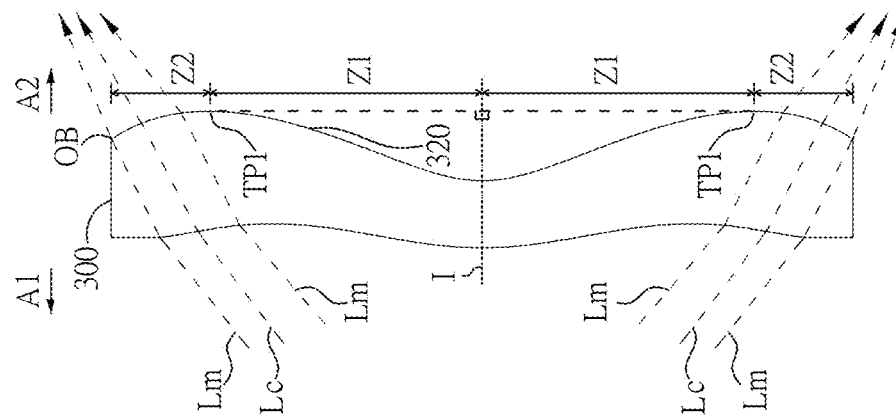
FIG. 5 depicts a schematic view of a third example of a surface shape and an effective radius of a lens element.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

According to some embodiments of the optical imaging lens of the present disclosure, the length of the optical imaging lens may maintain good optical characteristics by designing detail features of lens elements thereof. For example, the second lens element may be arranged to be a lens element having refracting power in a second order from the object side to the image side along the optical axis. A periphery region of the object-side surface of the second lens element may be convex. The third lens element may be arranged to be a lens element having refracting power in a second order from the image side to the object side along the optical axis. An optical axis region of the object-side surface of the third lens element may be concave. A periphery region of the image-side surface of the third lens element may be convex. The fourth lens element may be arranged to be a lens element having refracting power in a first order from the image side to the object side along the optical axis. A periphery region of the object-side surface of the fourth lens element may be concave. An optical axis region of the image-side surface of the fourth lens element may be concave. Through the combination of the abovementioned features, the optical imaging lens may effectively correct the longitudinal spherical aberration and the field curvature aberration, and reduce the distortion aberration.

In some embodiments of the present disclosure, the optical imaging lens may satisfy Inequality (1): $TTL/TL \geq 1.700$, and Inequality (2): $EFL/ImgH \geq 2.500$, which may effectively achieve matching up with the demand for slimming portable electronic devices and advantageously achieve the result of telescopic function. The further restrictions for Inequalities (1) and (2) as follows may constitute a better configuration: $1.700 \leq TTL/TL \leq 2.800$ and $2.500 \leq EFL/ImgH \leq 6.000$.

In some embodiments of the optical imaging lens of the present disclosure, for reducing the length of the lens system and maintaining good optical performance, the optical imaging lens may satisfy at least one of Inequalities (3)-(18), such that the air gap between two lens elements or the thickness of one lens element on the optical axis may be shortened properly for decreasing the length of the optical imaging lens and improving the imaging quality thereof. Since the difficulty of manufacture may also be considered, the further restrictions for Inequalities (3)-(18) as follows may constitute a better configuration:

$1.300 \leq ALT/(T1+G12) \leq 2.700;$ $1.000 \leq AAG/(T3+T4) \leq 4.000;$ $2.100 \leq BFL/(T1+T4) \leq 4.700;$ $1.200 \leq EFL/BFL \leq 2.300;$ $1.800 \leq BFL/(T1+T2+T3) \leq 3.900;$ $1.400 \leq AAG/(T2+T3) \leq 3.200;$ $0.500 \leq T4/T2 \leq 2.000;$ $1.700 \leq TL/(G12+G23) \leq 3.200;$ $1.000 \leq AAG/(T1+G34) \leq 3.400;$ $2.100 \leq AAG/(G34+T4) \leq 5.000;$ $1.400 \leq BFL/(G23+T3) \leq 4.600;$ $0.800 \leq ALT/AAG \leq 2.100;$ $2.300 \leq ALT/(T2+T3) \leq 3.800;$ $1.900 \leq G23/T4 \leq 6.100;$ $1.200 \leq T1/T4 \leq 3.200;$ $2.700 \leq EFL/AAG \leq 5.600.$ According to another embodiment of the optical imaging lens of the present disclosure, the optical imaging lens may further comprise at least one reflective element, which could fold the imaging rays, such that the optical imaging lens may meet the demand for slimming portable electronic devices. In another embodiment, the reflective element may be disposed between the fourth lens element and an image plane. In yet another embodiment, there are two reflective elements, in which one reflective element may be disposed between the fourth lens element and an image plane, and another reflective element may be disposed between the object side and the first lens element.

Moreover, any combined relation of embodiments may be selected to add to the limitation of the optical imaging lens for the design of the optical imaging lens with the same configuration. In consideration of the non-predictability of design for the optical system, while the optical imaging lens may satisfy any one of inequalities described above, the optical imaging lens according to the disclosure herein may improve an imaging quality and/or assembly yield, and/or effectively improve drawbacks of a typical optical imaging lens.

When implementing example embodiments, more details about the convex or concave surface and the refracting power of each lens element could be incorporated for one specific lens element or broadly for a plurality of lens elements to improve the control for the system performance and/or resolution and improve yield rate of manufacturing. Moreover, with respect to material design, all lens elements in the optical imaging lens of the present embodiments may be made of transparent material such as glass, plastic, resin, and the like. It is noted that the details listed here could be incorporated in example embodiments if no inconsistency occurs.

Figure 6:
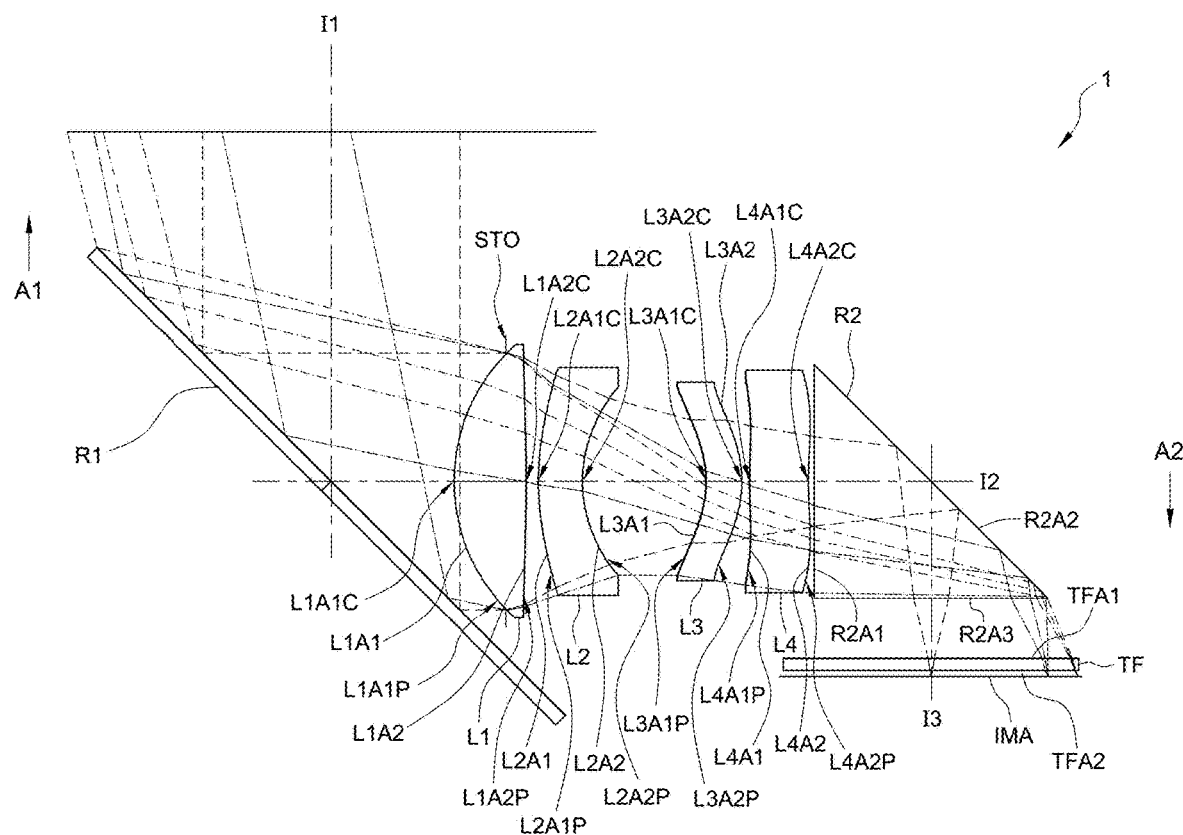
FIG. 6 depicts a cross-sectional view of the optical imaging lens according to the first embodiment of the present disclosure.
Figure 7:
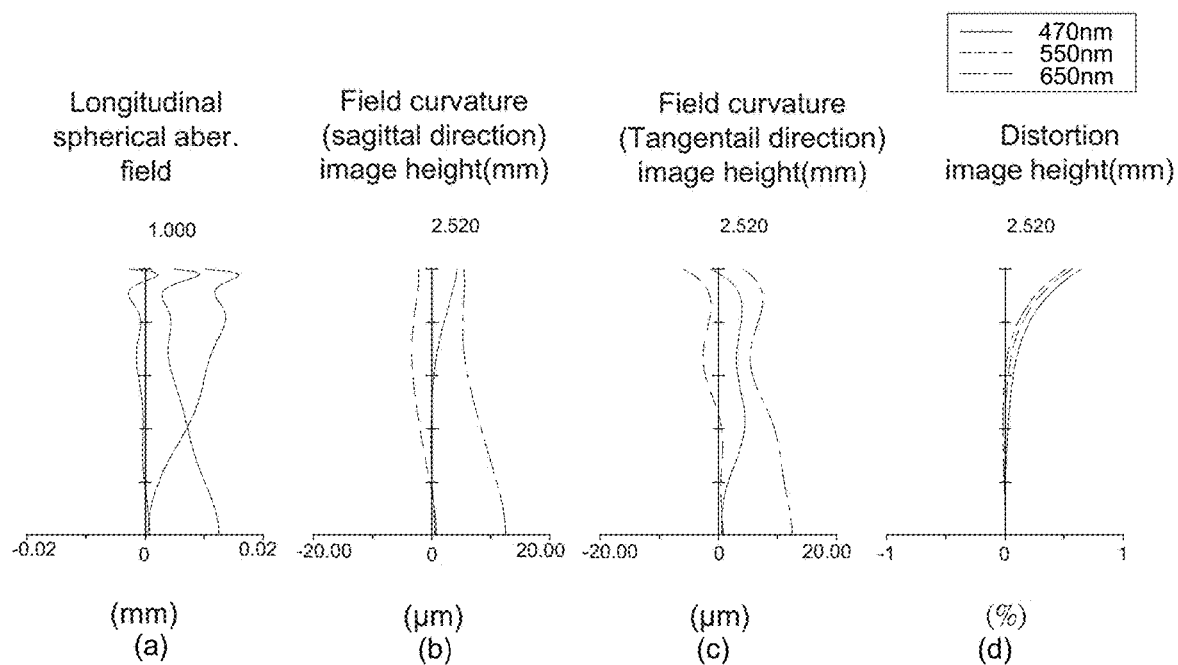
FIG. 7 depicts a chart of a longitudinal spherical aberration and other kinds of optical aberrations of the optical imaging lens according to the first embodiment of the present disclosure.

Several exemplary embodiments and associated optical data will now be provided to illustrate non-limiting examples of optical imaging lens systems having good optical characteristics that realize the goal of matching up with slim portable electronic devices. Reference is now made to FIGS. 6-9. FIG. 6 illustrates an example cross-sectional view of an optical imaging lens 1 according to a first embodiment. FIG. 7 shows example charts of a longitudinal spherical aberration and other kinds of optical aberrations of the optical imaging lens 1 according to the first embodiment. FIG. 8 illustrates an example table of optical data of each lens element of the optical imaging lens 1 according to the first embodiment. FIG. 9 depicts an example table of aspherical data of the optical imaging lens 1 according to the first embodiment. It is noted, negative values of the thickness/air gap in embodiments of present invention means the different direction of the optical axis.

As shown in FIG. 6, the optical imaging lens 1 of the present embodiment, in order from an object side A1 to an image side A2 along an optical axis, may comprise a first reflective element R1, an aperture stop STO, a first lens element L1, a second lens element L2, a third lens element L3, a fourth lens element L4 and a second reflective element R2. More specifically, the optical axis may comprise a first optical axis I1 parallel with the incident rays, a second optical axis I2 orthogonal and substantially perpendicular with the first optical axis I1 and a third optical axis I3 orthogonal and substantially perpendicular with the second optical axis I2, the object side A1 may be positioned on the first optical axis I1, and the image side A2 may be positioned on the third optical axis I3. The first reflective element R1 may be disposed between the object side A1 and the first lens element L1 and on the first optical axis I1, such that the incident rays along the first optical axis I1 may be folded to be along the second optical axis I2. The aperture stop STO, the first lens element L1, the second lens element L2, the third lens element L3 and the fourth lens element L4 may be disposed along the second optical axis I2. The second reflective element R2 may be disposed between the fourth lens element L4 and an image plane IMA of an image sensor (not shown) and on the third optical axis I3, such that the imaging rays passing through all lens elements (L1, L2, L3 and L4) along the second optical axis I2 may be folded to be along the third optical axis I3. A filtering unit TF and an image plane IMA may be positioned at the image side A2 of the optical imaging lens 1. Accordingly, the imaging rays may be folded by the first reflective element R1 and the second reflective element R2 disposed in the optical imaging lens 1, such that the optical imaging lens 1 may be accommodated in the portable electronic devices readily instead of limiting the system length of the optical imaging lens 1 to realize the goal of slim portable electronic devices.

The first reflective element R1 may be a planar mirror or a prism, and the second reflective element R2 may be a planar mirror or a prism. According to one embodiment, the first reflective element R1 may be a planar mirror, which has a plane intersecting the first optical axis I1 at about 45-degrees angle, and the second reflective element R2 may be a prism, which has an incident surface R2A1, a reflective surface R2A2 and an out-light surface R2A3, in which the incident surface R2A1 may be substantially perpendicular with the second optical axis I2, the reflective surface R2A2 may intersect the second optical axis I2 at about 45-degrees angle, and the out-light surface R2A3 may be substantially perpendicular with the third optical I3. Each of the first, second, third and fourth lens elements L1, L2, L3 and L4, and the filtering unit TF may comprise an object-side surface L1A1/L2A1/L3A1/L4A1/TFA1 facing toward the object side A1 and an image-side surface L1A2/L2A2/L3A2/L4A2/TFA2 facing toward the image side A2. The example embodiment of the illustrated filtering unit TF may be an IR cut filter (infrared cut-off filter) positioned between the second reflective element R2 and the image plane IMA.

First embodiment of each lens element of the optical imaging lens 1 will now be described with reference to the drawings. The lens elements L1, L2, L3 and L4 of the optical imaging lens 1 may be constructed using plastic materials in this embodiment for light weight devices, and should not be considered as a limitation.

According to the first embodiment of the optical imaging lens 1 of the present disclosure, the first lens element L1 may be arranged to be a lens element having refracting power in a first order from the object side A1 to the image side A2 along the optical axis, and the first lens element L1 may have positive refracting power. Both of the optical axis region L1A1C and the periphery region L1A1P of the object-side surface L1A1 of the first lens element L1 may be convex. Both of the optical axis region L1A2C and the periphery region L1A2P of the image-side surface L1A2 of the first lens element L1 may be convex.

According to the first embodiment of the optical imaging lens 1 of the present disclosure, the second lens element L2 may be arranged to be a lens element having refracting power in a second order from the object side A1 to the image side A2 along the optical axis, and the second lens element L2 may have negative refracting power. Both of the optical axis region L2A1C and the periphery region L2A1P of the object-side surface L2A1 of the second lens element L2 may be convex. Both of the optical axis region L2A2C and the periphery region L2A2P of the image-side surface L2A2 of the second lens element L2 may be concave.

According to the first embodiment of the optical imaging lens 1 of the present disclosure, the third lens element L3 may be arranged to be a lens element having refracting power in a second order from the image side A2 to the object side A1 along the optical axis, and the third lens element L3 may have negative refracting power. Both of the optical axis region L3A1C and the periphery region L3A1P of the object-side surface L3A1 of the third lens element L3 may be concave. Both of the optical axis region L3A2C and the periphery region L3A2P of the image-side surface L3A2 of the third lens element L3 may be convex.

According to the first embodiment of the optical imaging lens 1 of the present disclosure, the fourth lens element L4 may be arranged to be a lens element having refracting power in a first order from the image side A2 to the object side A1 along the optical axis, and the fourth lens element L4 may have positive refracting power. The optical axis region L4A1C of the object-side surface L4A1 of the fourth lens element L4 may be convex. The periphery region L4A1P of the object-side surface L4A1 of the fourth lens element L4 may be concave. The optical axis region L4A2C of the image-side surface L4A2 of the fourth lens element L4 may be concave. The periphery region L4A2P of the image-side surface L4A2 of the fourth lens element L4 may be convex.

According to the first embodiment of the optical imaging lens 1 of the present disclosure, the aspherical surfaces including the object-side surface L1A1 and the image-side surface L1A2 of the first lens element L1, the object-side surface L2A1 and the image-side surface L2A2 of the second lens element L2, the object-side surface L3A1 and the image-side surface L3A2 of the third lens element L3, and the object-side surface L4A1 and the image-side surface L4A2 of the fourth lens element L4, may all be defined by the following aspherical formula (1):

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \quad \text{formula (1)}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant; and $a_{2i}$ represents an aspherical coefficient of $2i^{th}$ level.

The values of each aspherical parameter are shown in FIG. 9.

FIG. 7(a) shows a longitudinal spherical aberration for three representative wavelengths (470 nm, 555 nm and 650 nm), wherein the vertical axis of FIG. 7(a) defines the field of view. FIG. 7(b) shows the field curvature aberration in the sagittal direction for three representative wavelengths (470 nm, 555 nm and 650 nm), wherein the vertical axis of FIG. 7(b) defines the image height. FIG. 7(c) shows the field curvature aberration in the tangential direction for three representative wavelengths (470 nm, 555 nm and 650 nm), wherein the vertical axis of FIG. 7(c) defines the image height. FIG. 7(d) shows a variation of the distortion aberration, wherein the horizontal axis of FIG. 7(d) defines the percentage, and wherein the vertical axis of FIG. 7(d) defines the image height. The three curves with different wavelengths (470 nm, 555 nm and 650 nm) may represent that off-axis light with respect to these wavelengths may be focused around an image point. From the vertical deviation of each curve shown in FIG. 7(a), the offset of the off-axis light relative to the image point may be within about ±0.014 mm. Therefore, the first embodiment may improve the longitudinal spherical aberration with respect to different wavelengths. Referring to FIG. 7(b), the focus variation with respect to the three different wavelengths (470 nm, 555 nm and 650 nm) in the whole field may fall within about ±14 µm. Referring to FIG. 7(c), and the focus variation with respect to the three different wavelengths (470 nm, 555 nm and 650 nm) in the whole field may fall within about ±14 µm. Referring to FIG. 7(d), the horizontal axis of FIG. 7(d), the variation of the distortion aberration may be within about ±0.6%.

The distance from the object-side surface L1A1 of the first lens element L1 to the image plane IMA along the optical axis (TTL) may be about 11.535 mm, Fno may be about 2.200, the half field of view (HFOV) of the optical imaging lens 1 may be about 14.502 degrees, and the effective focal length (EFL) of the optical imaging lens 1 may be about 9.687 mm.

Please refer to FIG. 46A for the values of T1, G12, T2, G23, T3, G34, T4, G4F, TTF, GFP, TTL, BFL, EFL, TL, ALT, AAG, ImgH, TTL/TL, EFL/ImgH, ALT/(T1+G12), AAG/(T3+T4), BFL/(T1+T4), EFL/BFL, BFL/(T1+T2+T3), AAG/(T2+T3), T4/T2, TL/(G12+G23), AAG/(T1+G34), AAG/(G34+T4), BFL/(G23+T3), ALT/AAG, ALT/(T2+T3), G23/T4, T1/T4 and EFL/AAG of the present embodiment.

Figure 10:
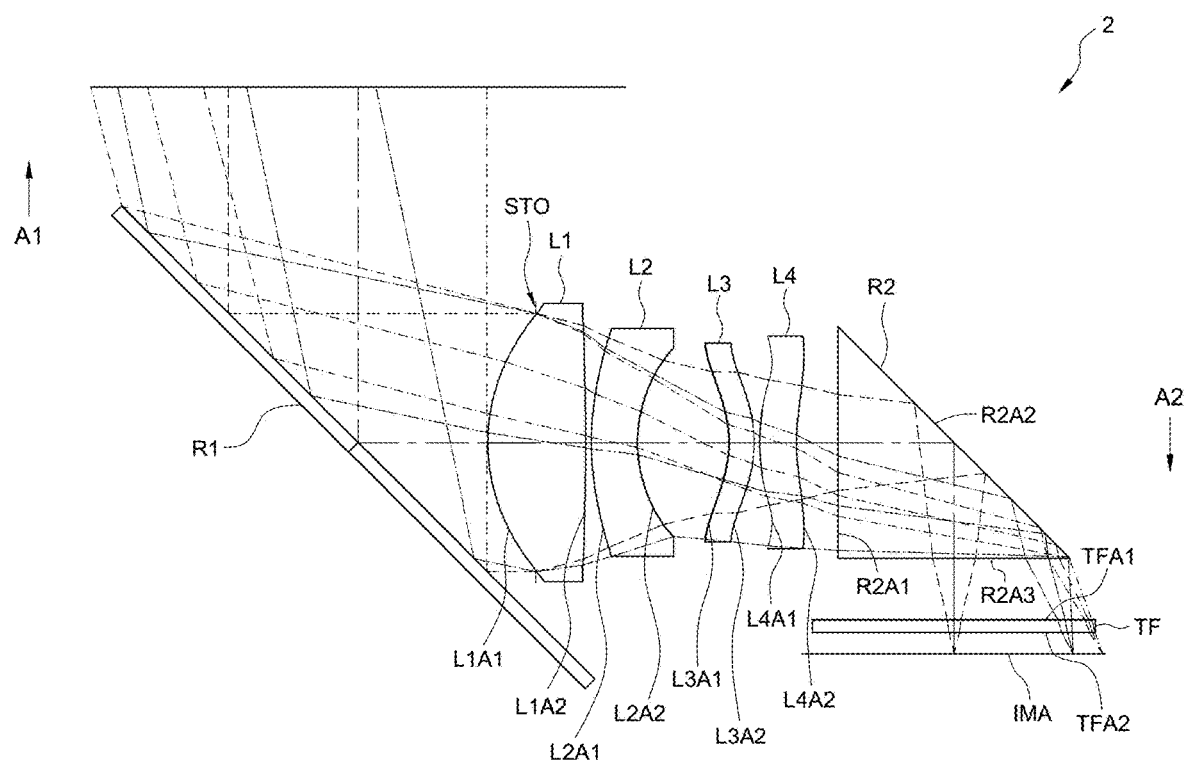
FIG. 10 depicts a cross-sectional view of the optical imaging lens according to the second embodiment of the present disclosure.
Figure 11:
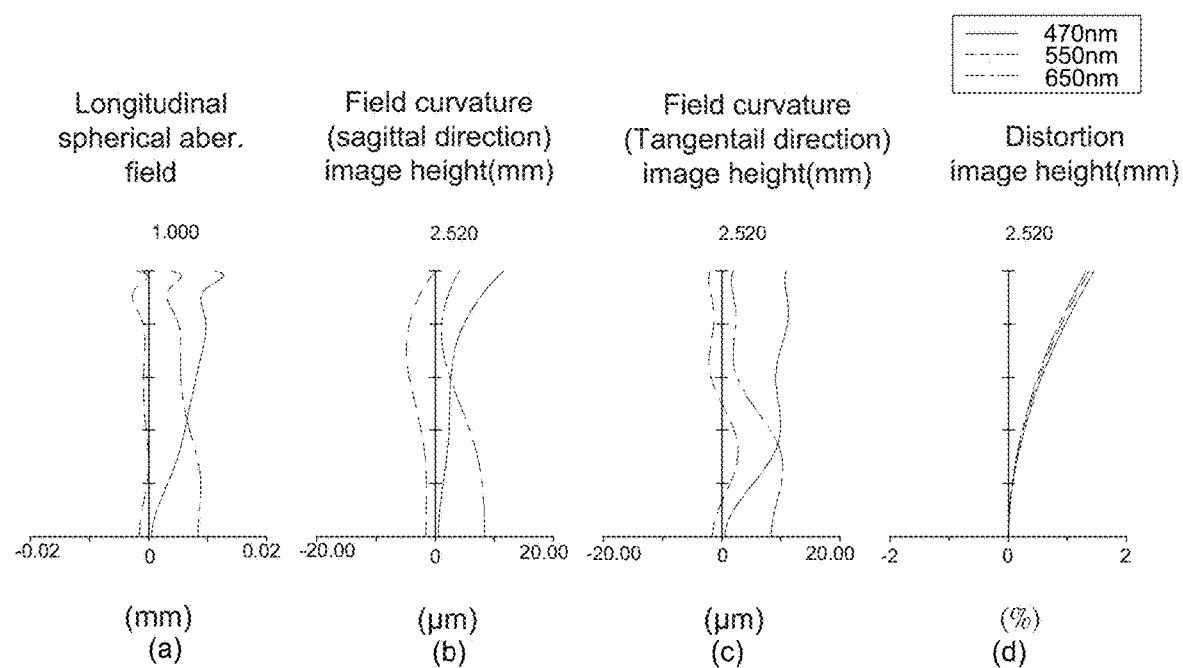
FIG. 11 depicts a chart of a longitudinal spherical aberration and other kinds of optical aberrations of the optical imaging lens according to the second embodiment of the present disclosure.

Reference is now made to FIGS. 10-13. FIG. 10 illustrates an example cross-sectional view of an optical imaging lens 2 according to a second embodiment. FIG. 11 shows example charts of a longitudinal spherical aberration and other kinds of optical aberrations of the optical imaging lens 2 according to the second embodiment. FIG. 12 shows an example table of optical data of each lens element of the optical imaging lens 2 according to the second embodiment. FIG. 13 shows an example table of aspherical data of the optical imaging lens 2 according to the second embodiment.

As shown in FIG. 10, the optical imaging lens 2 of the present embodiment, in an order from an object side A1 to an image side A2 along an optical axis, may comprise a first reflective element R1, an aperture stop STO, a first lens element L1, a second lens element L2, a third lens element L3, a fourth lens element L4 and a second reflective element R2.

The arrangement of the convex or concave surface structures, including the object-side surfaces L1A1, L2A1, L3A1, and L4A1 and the image-side surfaces L1A2, L2A2, L3A2, and L4A2 may be generally similar to the optical imaging lens 1, but the differences between the optical imaging lens 1 and the optical imaging lens 2 may include a radius of curvature, a thickness, aspherical data, and/or an effective focal length of each lens element.

Here, in the interest of clearly showing the drawings of the present embodiment, only the surface shapes which are different from that in the first embodiment may be labeled. Please refer to FIG. 12 for the optical characteristics of each lens element in the optical imaging lens 2 of the present embodiment.

From the vertical deviation of each curve shown in FIG. 11(a), the offset of the off-axis light relative to the image point may be within about ±0.014 mm. Referring to FIG. 11(b), and the focus variation with respect to the three different wavelengths (470 nm, 555 nm and 650 nm) in the whole field may fall within about ±12 μm. Referring to FIG. 11(c), the focus variation with respect to the three different wavelengths (470 nm, 555 nm and 650 nm) in the whole field may fall within about ±12 μm. Referring to FIG. 11(d), the variation of the distortion aberration of the optical imaging lens 2 may be within about ±1.5%.

Please refer to FIG. 46A for the values of T1, G12, T2, G23, T3, G34, T4, G4F, TTF, GFP, TTL, BFL, EFL, TL, ALT, AAG, ImgH, TTL/TL, EFL/ImgH, ALT/(T1+G12), AAG/(T3+T4), BFL/(T1+T4), EFL/BFL, BFL/(T1+T2+T3), AAG/(T2+T3), T4/T2, TL/(G12+G23), AAG/(T1+G34), AAG/(G34+T4), BFL/(G23+T3), ALT/AAG, ALT/(T2+T3), G23/T4, T1/T4 and EFL/AAG of the present embodiment.

Figure 14:
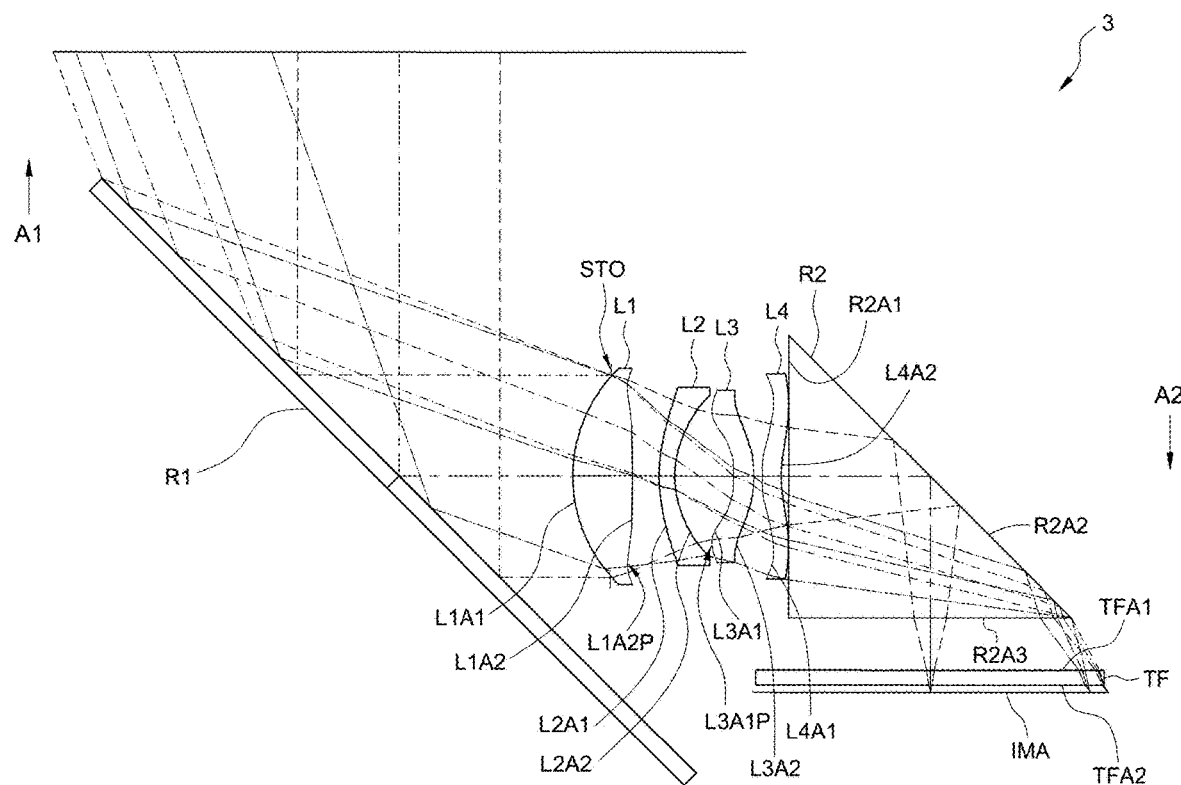
FIG. 14 depicts a cross-sectional view of the optical imaging lens according to the third embodiment of the present disclosure.
Figure 15:
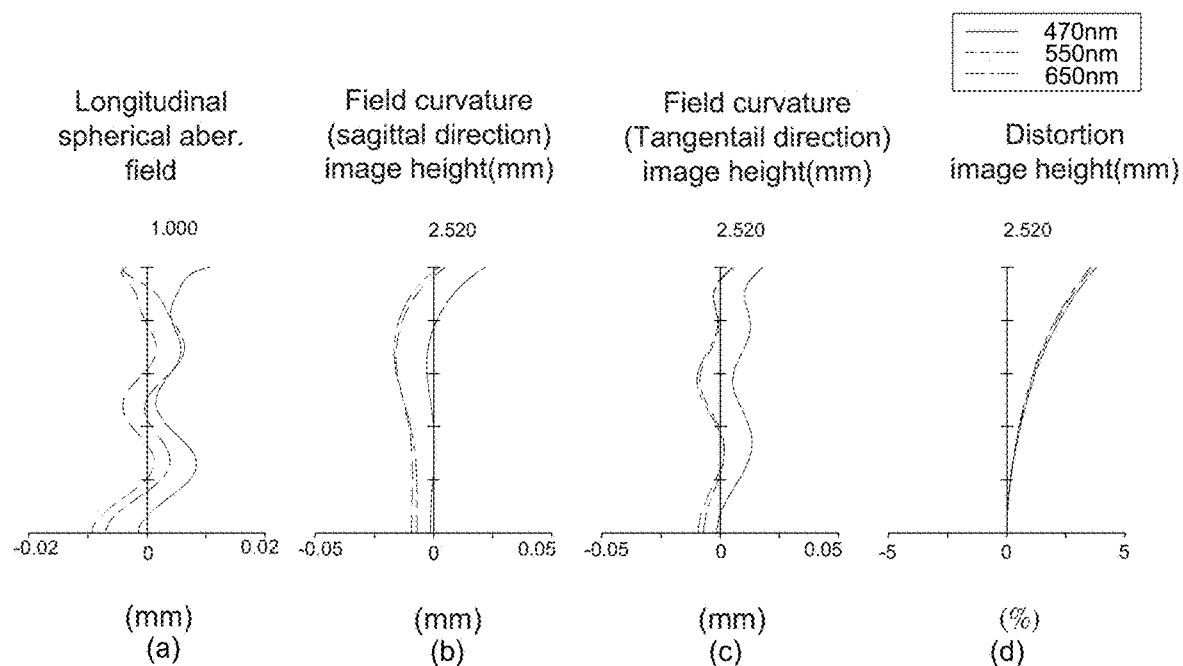
FIG. 15 depicts a chart of a longitudinal spherical aberration and other kinds of optical aberrations the optical imaging lens according to the third embodiment of the present disclosure.

In comparison with the first embodiment, the longitudinal spherical aberration and field curvature aberration in the sagittal direction in the second embodiment may be smaller, and TTL of the optical imaging lens 2 may be shorter Reference is now made to FIGS. 14-17. FIG. 14 illustrates an example cross-sectional view of an optical imaging lens 3 according to a third embodiment. FIG. 15 shows example charts of a longitudinal spherical aberration and other kinds of optical aberrations of the optical imaging lens 3 according to the third embodiment. FIG. 16 shows an example table of optical data of each lens element of the optical imaging lens 3 according to the third embodiment. FIG. 17 shows an example table of aspherical data of the optical imaging lens 3 according to the third embodiment.

As shown in FIG. 14, the optical imaging lens 3 of the present embodiment, in an order from an object side A1 to an image side A2 along an optical axis, may comprise a first reflective element R1, an aperture stop STO, a first lens element L1, a second lens element L2, a third lens element L3, a fourth lens element L4 and a second reflective element R2.

The arrangement of the convex or concave surface structures, including the object-side surfaces L1A1, L2A1, and L4A1 and the image-side surfaces L2A2, L3A2, and L4A2 may be generally similar to the optical imaging lens 1, but the differences between the optical imaging lens 1 and the optical imaging lens 3 may include the refracting power of the third lens element L3, the concave or concave surface structures of the object-side surface L3A1 and the image-side surface L1A2, a radius of curvature, a thickness, aspherical data, and/or an effective focal length of each lens element. More specifically, the periphery region L1A2P of the image-side surface L1A2 of the first lens element L1 may be concave, the periphery region L3A1P of the object-side surface L3A1 of the third lens element L3 may be convex, and the third lens element L3 may have positive refracting power.

Here, in the interest of clearly showing the drawings of the present embodiment, only the surface shapes which are different from that in the first embodiment may be labeled. Please refer to FIG. 16 for the optical characteristics of each lens element in the optical imaging lens 3 of the present embodiment.

From the vertical deviation of each curve shown in FIG. 15(a), the offset of the off-axis light relative to the image point may be within about ±0.012 mm. Referring to FIG. 15(b), the focus variation with respect to the three different wavelengths (470 nm, 555 nm and 650 nm) in the whole field may fall within about ±0.003 mm. Referring to FIG. 15(c), the focus variation with respect to the three different wavelengths (470 nm, 555 nm and 650 nm) in the whole field may fall within about ±0.025 mm. Referring to FIG. 15(d), the variation of the distortion aberration of the optical imaging lens 3 may be within about ±4%.

Please refer to FIG. 46A for the values of T1, G12, T2, G23, T3, G34, T4, G4F, TTF, GFP, TTL, BFL, EFL, TL, ALT, AAG, ImgH, TTL/TL, EFL/ImgH, ALT/(T1+G12), AAG/(T3+T4), BFL/(T1+T4), EFL/BFL, BFL/(T1+T2+T3), AAG/(T2+T3), T4/T2, TL/(G12+G23), AAG/(T1+G34), AAG/(G34+T4), BFL/(G23+T3), ALT/AAG, ALT/(T2+T3), G23/T4, T1/T4 and EFL/AAG of the present embodiment.

In comparison with the first embodiment, the longitudinal spherical aberration may be smaller, and TTL of the optical imaging lens 3 and the effective focal length of the optical imaging lens 3 in the third embodiment may be shorter.

Figure 18:
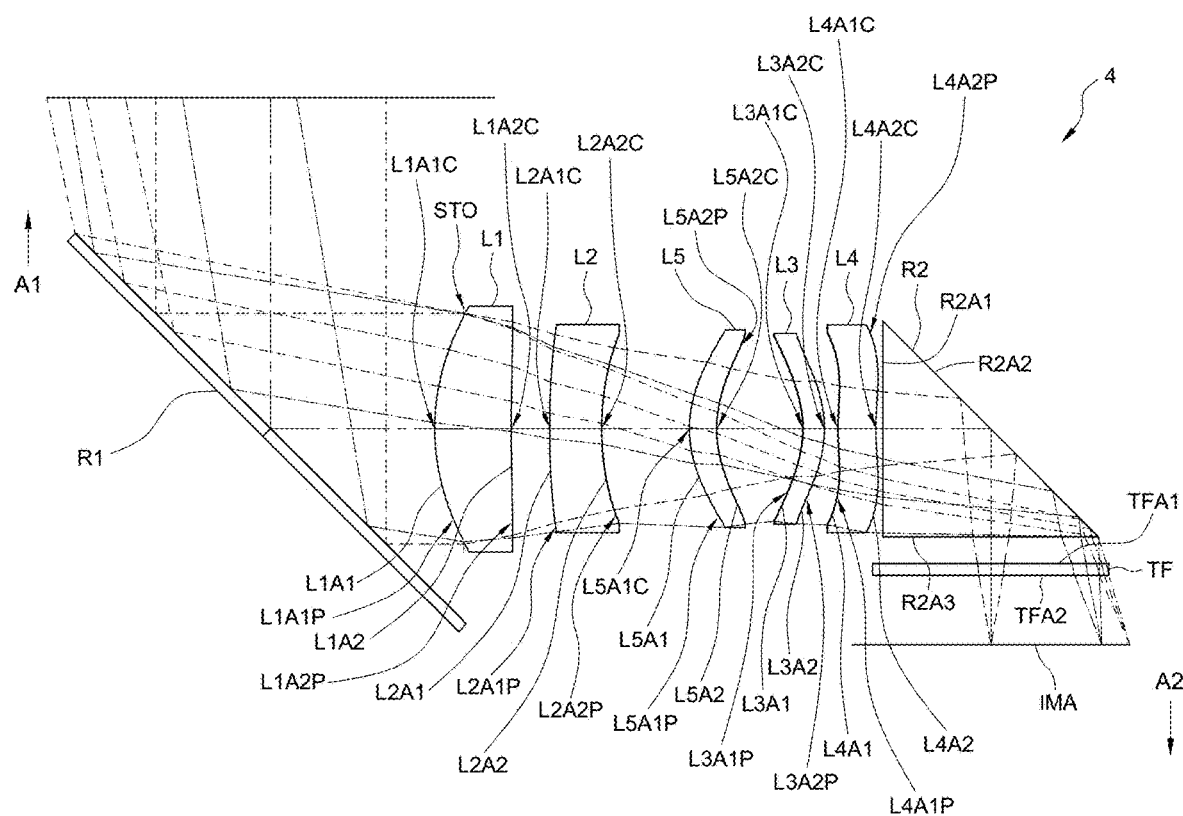
FIG. 18 depicts a cross-sectional view of the optical imaging lens according to the fourth embodiment of the present disclosure.
Figure 19:
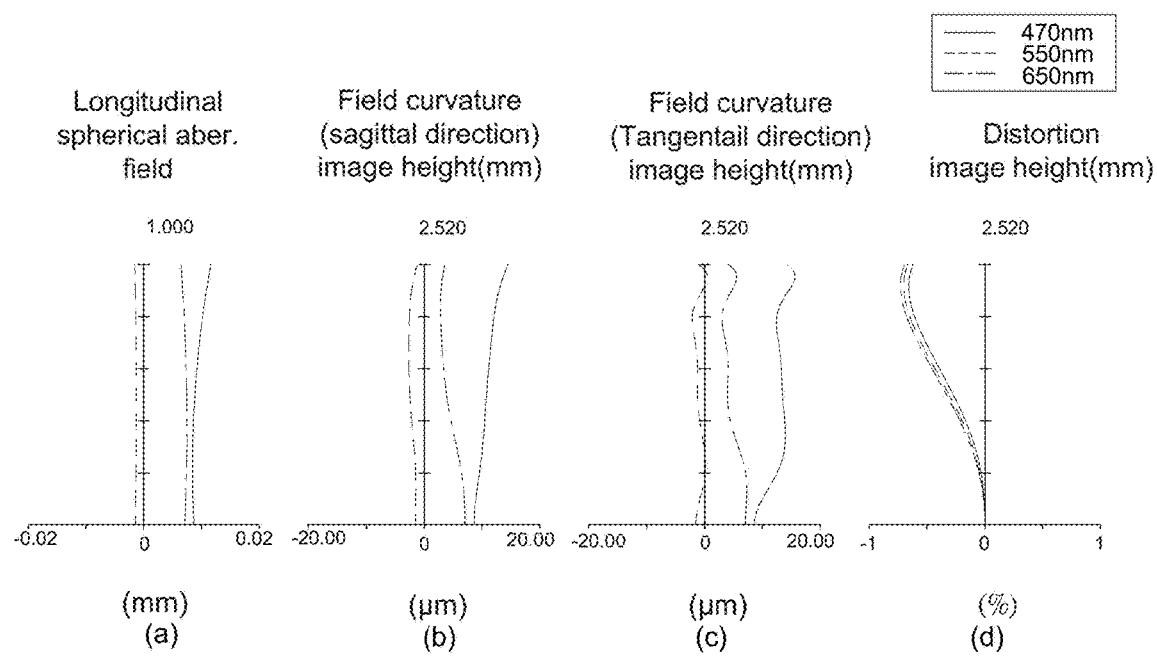
FIG. 19 depicts a chart of a longitudinal spherical aberration and other kinds of optical aberrations of the optical imaging lens according to the fourth embodiment of the present disclosure.

Reference is now made to FIGS. 18-21. FIG. 18 illustrates an example cross-sectional view of an optical imaging lens 4 according to a fourth embodiment. FIG. 19 shows example charts of a longitudinal spherical aberration and other kinds of optical aberrations of the optical imaging lens 4 according to the fourth embodiment. FIG. 20 shows an example table of optical data of each lens element of the optical imaging lens 4 according to the fourth embodiment. FIG. 2I shows an example table of aspherical data of the optical imaging lens 4 according to the fourth embodiment.

As shown in FIG. 18, the optical imaging lens 4 of the present embodiment, in an order from an object side A1 to an image side A2 along an optical axis, may comprise a first reflective element R1, an aperture stop STO, a first lens element L1, a second lens element L2, a fifth lens element L5, a third lens element L3, a fourth lens element L4, and a reflective element R2. Accordingly, the imaging rays may be folded by the first reflective element R1 and the second reflective element R2 disposed in the optical imaging lens 4, such that the optical imaging lens 4 may be accommodated in the portable electronic devices easily instead of limitation from the system length of the optical imaging lens 4 to realize the goal of slim portable electronic devices.

According to the fourth embodiment of the optical imaging lens 4 of the present disclosure, the first lens element L1 may be arranged to be a lens element having refracting power in a first order from the object side A1 to the image side A2 along the optical axis, and the first lens element L1 may have positive refracting power. Both of the optical axis region L1A1C and the periphery region L1A1P of the object-side surface L1A1 of the first lens element L1 may be convex. The optical axis region L1A2C of the image-side surface L1A2 of the first lens element L1 may be concave. The periphery region L1A2P of the image-side surface L1A2 of the first lens element L1 may be convex.

According to the fourth embodiment of the optical imaging lens 4 of the present disclosure, the second lens element L2 may be arranged to be a lens element having refracting power in a second order from the object side A1 to the image side A2 along the optical axis, and the second lens element L2 may have negative refracting power. Both of the optical axis region L2A1C and the periphery region L2A1P of the object-side surface L2A1 of the second lens element L2 may be convex. Both of the optical axis region L2A2C and the periphery region L2A2P of the image-side surface L2A2 of the second lens element L2 may be concave.

According to the fourth embodiment of the optical imaging lens 4 of the present disclosure, the fifth lens element L5 may be arranged to be a lens element having refracting power in a third order from the object side A1 to the image side A2 along the optical axis, and the fifth lens element L5 may have positive refracting power. Both of the optical axis region L5A1C and the periphery region L5A1P of the object-side surface L5A1 of the fifth lens element L5 may be convex. Both of the optical axis region L5A2C and the periphery region L5A2P of the image-side surface L5A2 of the fifth lens element L5 may be concave.

According to the fourth embodiment of the optical imaging lens 4 of the present disclosure, the third lens element L3 may be arranged to be a lens element having refracting power in a second order from the image side A2 to the object side A1 along the optical axis, and the third lens element L3 may have negative refracting power. Both of the optical axis region L3A1C and the periphery region L3A1P of the object-side surface L3A1 of the third lens element L3 may be concave. Both of the optical axis region L3A2C and the periphery region L3A2P of the image-side surface L3A2 of the third lens element L3 may be convex.

According to the fourth embodiment of the optical imaging lens 4 of the present disclosure, the fourth lens element L4 may be arranged to be a lens element having refracting power in a first order from the image side A2 to the object side A1 along the optical axis, and the fourth lens element L4 may have negative refracting power. The optical axis region L4A1C of the object-side surface L4A1 of the fourth lens element L4 may be convex. The periphery region L4A1P of the object-side surface L4A1 of the fourth lens element L4 may be concave. The optical axis region L4A2C of the image-side surface L4A2 of the fourth lens element L4 may be concave. The periphery region L4A2P of the image-side surface L4A2 of the fourth lens element L4 may be convex.

According to the fourth embodiment of the optical imaging lens 4 of the present disclosure, the aspherical surfaces including the object-side surface L1A1 and the image-side surface L1A2 of the first lens element L1, the object-side surface L2A1 and the image-side surface L2A2 of the second lens element L2, the object-side surface L5A1 and the image-side surface L5A2 of the fifth lens element L5, the object-side surface L3A1 and the image-side surface L3A2 of the third lens element L3, and the object-side surface L4A1 and the image-side surface L4A2 of the fourth lens element L4, may all be defined by the previously described aspherical formula (1).

Here, in the interest of clearly showing the drawings of the present embodiment, only the surface shapes which are different from that in the first embodiment may be labeled. Please refer to FIG. 20 for the optical characteristics of each lens element in the optical imaging lens 4 of the present embodiment.

From the vertical deviation of each curve shown in FIG. 19(a), the offset of the off-axis light relative to the image point may be within about ±0.014 mm. Referring to FIG. 19(b), the focus variation with respect to the three different wavelengths (470 nm, 555 nm and 650 nm) in the whole field may fall within about ±16 μm. Referring to FIG. 19(c), the focus variation with respect to the three different wavelengths (470 nm, 555 nm and 650 nm) in the whole field may fall within about ±16 μm. Referring to FIG. 19(d), the variation of the distortion aberration of the optical imaging lens 4 may be within about ±0.8%.

The distance from the object-side surface L1A1 of the first lens element L1 to the image plane IMA along the optical axis (TTL) may be about 14.001 mm, Fno may be about 2.933, the half field of view (HFOV) of the optical imaging lens 4 may be about 11.709 degrees, and the effective focal length (EFL) of the optical imaging lens 4 may be about 12.238 mm.

Please refer to FIG. 46B for the values of T1, G12, T2, G25, T5, G53, T3, G34, T4, G4F, TTF, GFP, TTL, G23, BFL, EFL, TL, ALT, AAG, ImgH, TTL/TL, EFL/ImgH, ALT/(T1+G12), AAG/(T3+T4), BFL/(T1+T4), EFL/BFL, BFL/(T1+T2+T3), AAG/(T2+T3), T4/T2, TL/(G12+G23), AAG/(T1+G34), AAG/(G34+T4), BFL/(G23+T3), ALT/AAG, ALT/(T2+T3), G23/T4, T1/T4 and EFL/AAG of the present embodiment.

Figure 22:
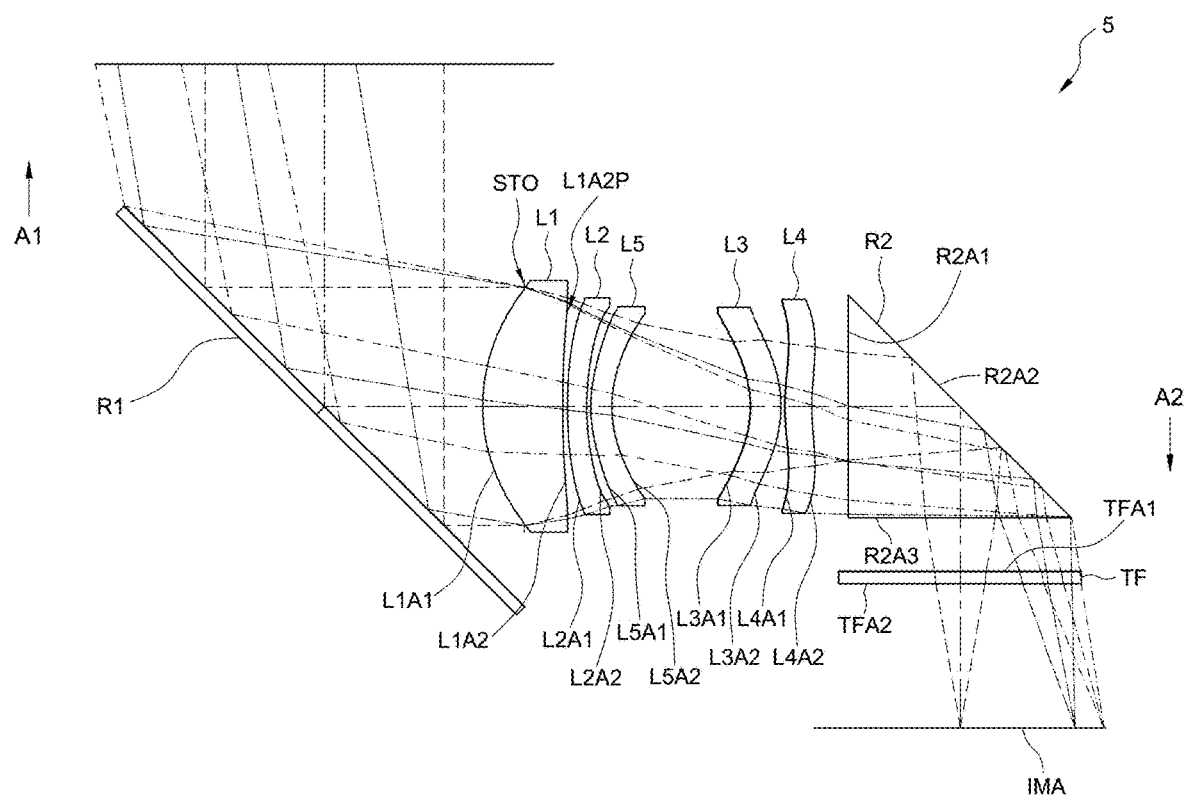
FIG. 22 depicts a cross-sectional view of the optical imaging lens according to the fifth embodiment of the present disclosure.
Figure 23:
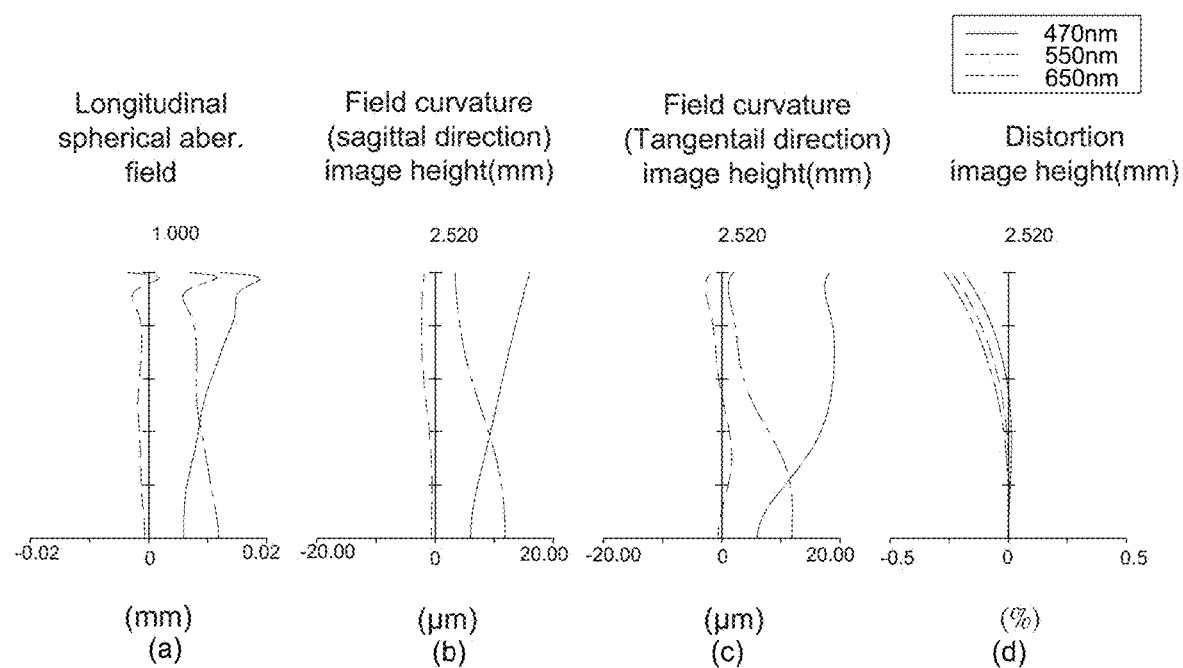
FIG. 23 depicts a chart of a longitudinal spherical aberration and other kinds of optical aberrations of the optical imaging lens according to the fifth embodiment of the present disclosure.

Reference is now made to FIGS. 22-25. FIG. 22 illustrates an example cross-sectional view of an optical imaging lens 5 according to a fifth embodiment. FIG. 23 shows example charts of a longitudinal spherical aberration and other kinds of optical aberrations of the optical imaging lens 5 according to the fifth embodiment. FIG. 24 shows an example table of optical data of each lens element of the optical imaging lens 5 according to the fifth embodiment. FIG. 25 shows an example table of aspherical data of the optical imaging lens 5 according to the fifth embodiment.

As shown in FIG. 22, the optical imaging lens 5 of the present embodiment, in an order from an object side A1 to an image side A2 along an optical axis, may comprise a first reflective element R1, an aperture stop STO a first lens element L1, a second lens element L2, a fifth lens element L5, a third lens element L3, a fourth lens element L4 and a second reflective element R2.

The arrangement of the convex or concave surface structures, including the object-side surfaces L1A1, L2A1, L5A1, L3A1, and L4A1 and the image-side surfaces L2A2, L5A2, L3A2 and L4A2 may be generally similar to the optical imaging lens 4, but the differences between the optical imaging lens 4 and the optical imaging lens 5 may include the concave or concave surface structures of the image-side surface L1A2, and the refracting power of the fourth lens element L4 and the fifth lens element L5. Additional differences may include a radius of curvature, a thickness, aspherical data, and/or an effective focal length of each lens element. More specifically, the periphery region L1A2P of the image-side surface L1A2 of the first lens element L1 may be concave, the fourth lens element L4 may have positive refracting power, and the fifth lens element L5 may have negative refracting power.

Here, in the interest of clearly showing the drawings of the present embodiment, only the surface shapes which are different from that in the fourth embodiment may be labeled. Please refer to FIG. 24 for the optical characteristics of each lens element in the optical imaging lens 5 of the present embodiment.

From the vertical deviation of each curve shown in FIG. 23(a), the offset of the off-axis light relative to the image point may be within about ±0.020 mm. Referring to FIG. 23(b), the focus variation with respect to the three different wavelengths (470 nm, 555 nm and 650 nm) in the whole field may fall within about ±18 µm. Referring to FIG. 23(c), the focus variation with respect to the three different wavelengths (470 nm, 555 nm and 650 nm) in the whole field may fall within about ±20 µm. Referring to FIG. 23(d), the variation of the distortion aberration of the optical imaging lens 5 may be within about ±0.3%.

Please refer to FIG. 46B for the values of T1, G12, T2, G25, T5, G53, T3, G34, T4, G4F, TTF, GFP, TTL, G23, BFL, EFL, TL, ALT, AAG, ImgH, TTL/TL, EFL/ImgH, ALT/(T1+G12), AAG/(T3+T4), BFL/(T1+T4), EFL/BFL, BFL/(T1+T2+T3), AAG/(T2+T3), T4/T2, TL/(G12+G23), AAG/(T1+G34), AAG/(G34+T4), BFL/(G23+T3), ALT/AAG, ALT/(T2+T3), G23/T4, T1/T4 and EFL/AAG of the present embodiment.

In comparison with the fourth embodiment, TTL of the optical imaging lens 5 in the fifth embodiment may be shorter, and the distortion aberration in the fifth embodiment may be smaller.

Figure 26:
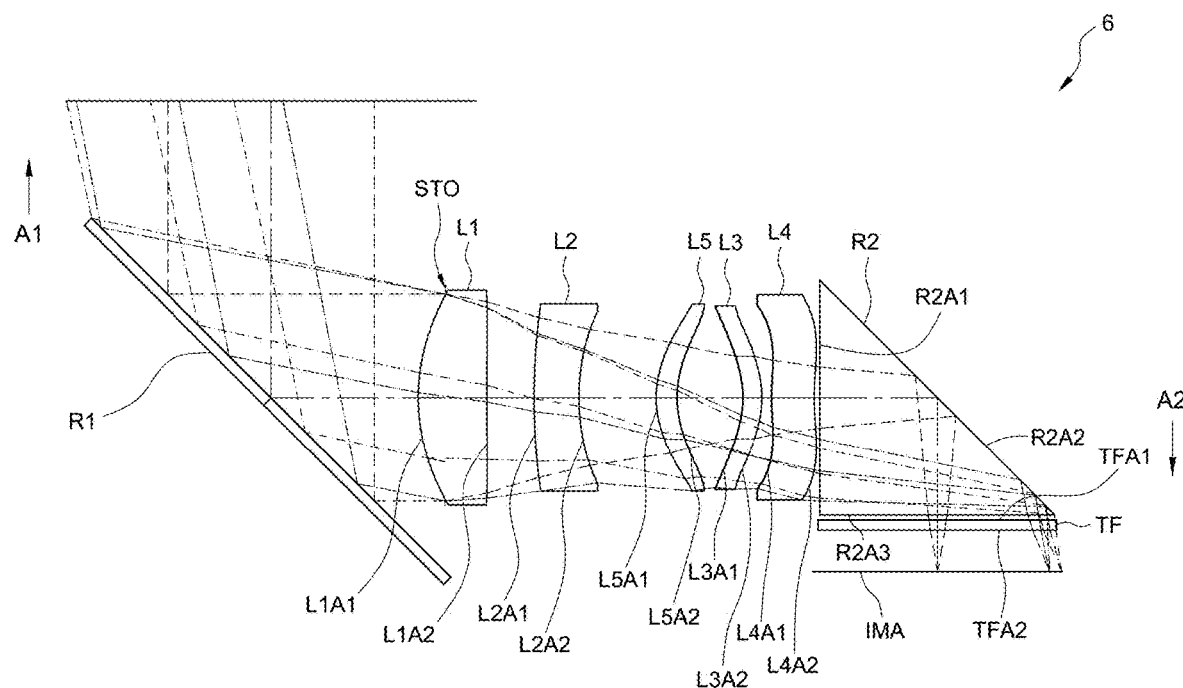
FIG. 26 depicts a cross-sectional view of the optical imaging lens according to the sixth embodiment of the present disclosure.
Figure 27:
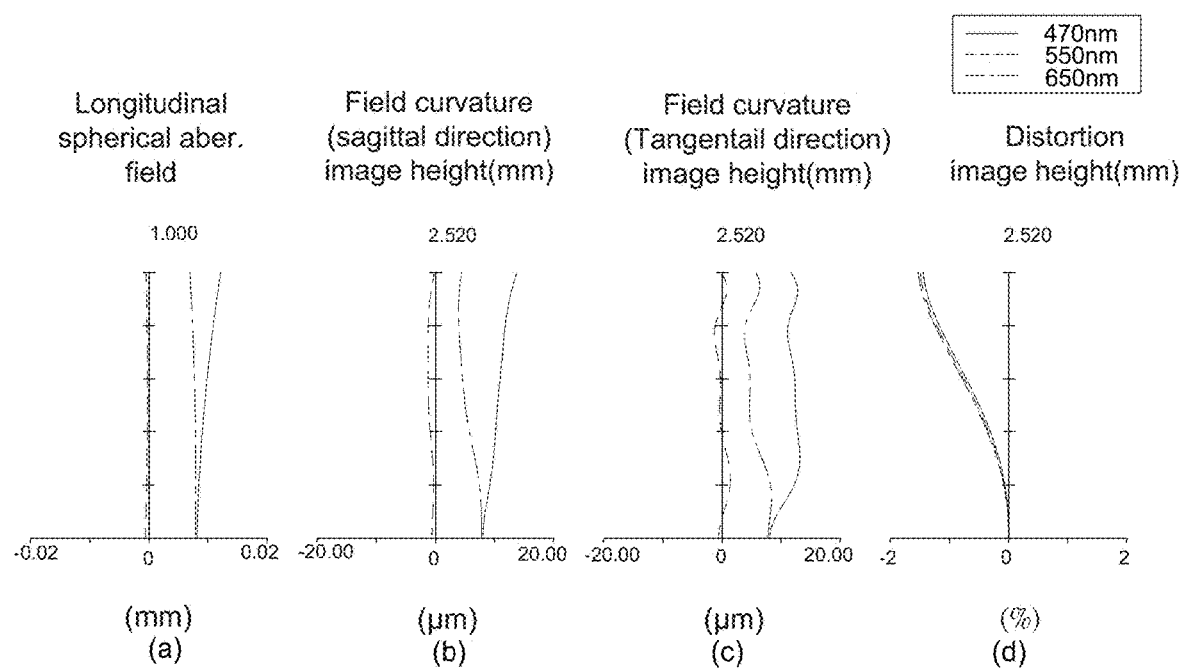
FIG. 27 depicts a chart of a longitudinal spherical aberration and other kinds of optical aberrations of the optical imaging lens according to the sixth embodiment of the present disclosure.

Reference is now made to FIGS. 26-29. FIG. 26 illustrates an example cross-sectional view of an optical imaging lens 6 according to a sixth embodiment. FIG. 27 shows example charts of a longitudinal spherical aberration and other kinds of optical aberrations of the optical imaging lens 6 according to the sixth embodiment. FIG. 28 shows an example table of optical data of each lens element of the optical imaging lens 6 according to the sixth embodiment. FIG. 29 shows an example table of aspherical data of the optical imaging lens 6 according to the sixth embodiment.

As shown in FIG. 26, the optical imaging lens 6 of the present embodiment, in an order from an object side A1 to an image side A2 along an optical axis, may comprise a first reflective element R1, an aperture stop STO, a first lens element L1, a second lens element L2, a fifth lens element L5, a third lens element L3, a fourth lens element L4 and a second reflective element R2.

The arrangement of the convex or concave surface structures, including the object-side surfaces L1A1, L2A1, L5A1, L3A1, and L4A1 and the image-side surfaces L1A2, L2A2, L5A2, L3A2, and L4A2 may be generally similar to the optical imaging lens 4, but the differences between the optical imaging lens 4 and the optical imaging lens 6 may include a radius of curvature, a refracting power, a thickness, aspherical data, and/or an effective focal length of each lens element.

Here, in the interest of clearly showing the drawings of the present embodiment, only the surface shapes which are different from that in the fourth embodiment may be labeled. Please refer to FIG. 28 for the optical characteristics of each lens element in the optical imaging lens 6 of the present embodiment.

From the vertical deviation of each curve shown in FIG. 27(a), the offset of the off-axis light relative to the image point may be within about ±0.013 mm. Referring to FIG. 27(b), the focus variation with respect to the three different wavelengths (470 nm, 555 nm and 650 nm) in the whole field may fall within about ±14 µm. Referring to FIG. 27(c), the focus variation with respect to the three different wavelengths (470 nm, 555 nm and 650 nm) in the whole field may fall within about ±14 µm. Referring to FIG. 27(d), the variation of the distortion aberration of the optical imaging lens 6 may be within about ±1.6%.

Please refer to FIG. 46B for the values of T1, G12, T2, G25, T5, G53, T3, G34, T4, G4F, TTF, GFP, TTL, G23, BFL, EFL, TL, ALT, AAG, ImgH, TTL/TL, EFL/ImgH, ALT/(T1+G12), AAG/(T3+T4), BFL/(T1+T4), EFL/BFL, BFL/(T1+T2+T3), AAG/(T2+T3), T4/T2, TL/(G12+G23), AAG/(T1+G34), AAG/(G34+T4), BFL/(G23+T3), ALT/AAG, ALT/(T2+T3), G23/T4, T1/T4 and EFL/AAG of the present embodiment.

In comparison with the fourth embodiment, HFOV of the optical image lens 6 may be larger, the length and the effective focal length of the optical image lens 6 may be shorter, and Fno, the longitudinal spherical aberration and the field curvature aberration in the sixth embodiment may be smaller.

Figure 30:
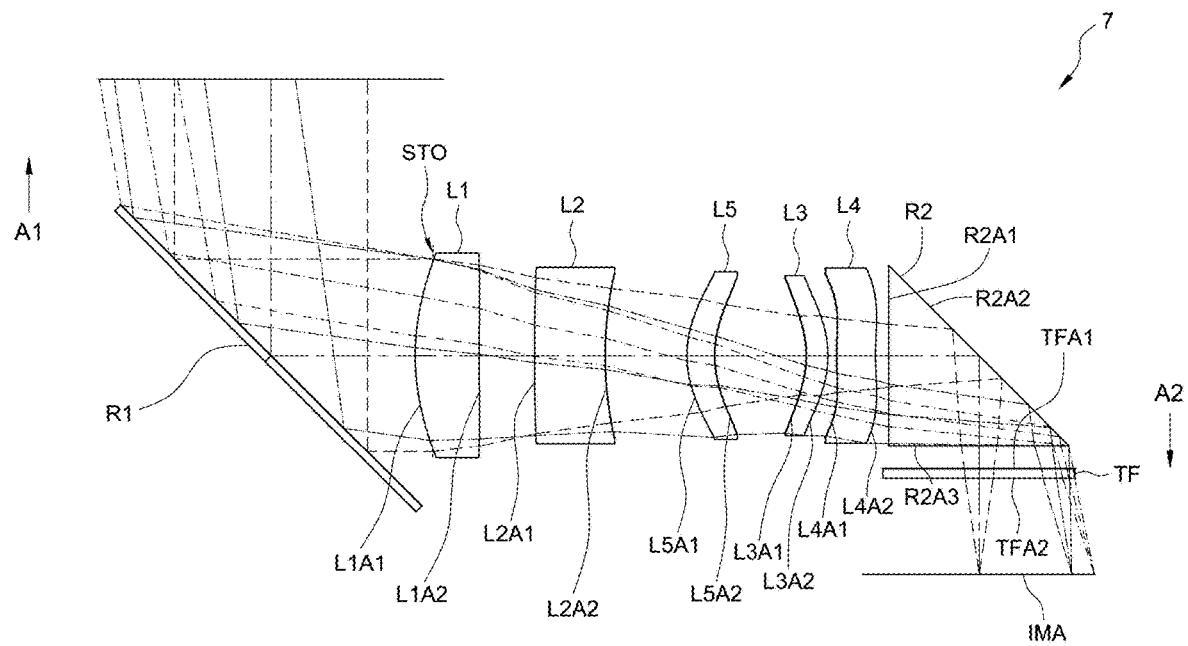
FIG. 30 depicts a cross-sectional view of the optical imaging lens according to the seventh embodiment of the present disclosure.
Figure 31:
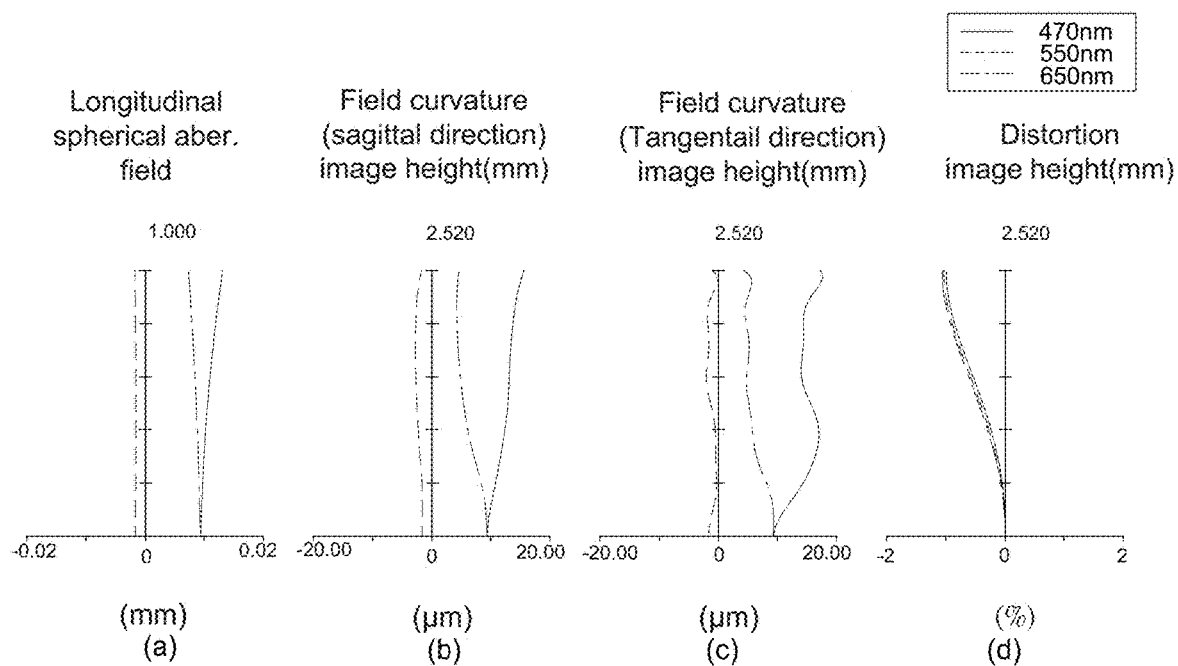
FIG. 31 depicts a chart of a longitudinal spherical aberration and other kinds of optical aberrations of the optical imaging lens according to the seventh embodiment of the present disclosure.

Reference is now made to FIGS. 30-33. FIG. 30 illustrates an example cross-sectional view of an optical imaging lens 7 according to a seventh embodiment. FIG. 31 shows example charts of a longitudinal spherical aberration and other kinds of optical aberrations of the optical imaging lens 7 according to the seventh embodiment. FIG. 32 shows an example table of optical data of each lens element of the optical imaging lens 7 according to the seventh embodiment. FIG. 33 shows an example table of aspherical data of the optical imaging lens 7 according to the seventh embodiment.

As shown in FIG. 30, the optical imaging lens 7 of the present embodiment, in an order from an object side A1 to an image side A2 along an optical axis, may comprise a first reflective element R1, an aperture stop STO, a first lens element L1, a second lens element L2, a fifth lens element L5, a third lens element L3, a fourth lens element L4, and a second reflective element R2.

The arrangement of the convex or concave surface structures, including the object-side surfaces L1A1, L2A1, L5A1, L3A1, and L4A1 and the image-side surfaces L1A2, L2A2, L5A2, L3A2, and L4A2 may be generally similar to the optical imaging lens 4, but the differences between the optical imaging lens 4 and the optical imaging lens 7 may include the refracting power of the fourth lens element L4, a radius of curvature, a thickness, aspherical data, and/or an effective focal length of each lens element. More specifically, the fourth lens element L4 may have positive refracting power.

Here, in the interest of clearly showing the drawings of the present embodiment, only the surface shapes which are different from that in the fourth embodiment may be labeled. Please refer to FIG. 32 for the optical characteristics of each lens element in the optical imaging lens 7 of the present embodiment.

From the vertical deviation of each curve shown in FIG. 31(a), the offset of the off-axis light relative to the image point may be within about ±0.014 mm. Referring to FIG. 31(b), the focus variation with respect to the three different wavelengths (470 nm, 555 nm and 650 nm) mm in the whole field may fall within about ±16 µm. Referring to FIG. 31(c), the focus variation with respect to the three different wavelengths (470 nm, 555 nm and 650 nm) in the whole field may fall within about ±18 µm. Referring to FIG. 31(d), the variation of the distortion aberration of the optical imaging lens 7 may be within about ±1.2%.

Please refer to FIG. 46B for the values of T1, G12, T2, G25, T5, G53, T3, G34, T4, G4F, TTF, GFP, TTL, G23, BFL, EFL, TL, ALT, AAG, ImgH, TTL/TL, EFL/ImgH, ALT/(T1+G12), AAG/(T3+T4), BFL/(T1+T4), EFL/BFL, BFL/(T1+T2+T3), AAG/(T2+T3), T4/T2, TL/(G12+G23), AAG/(T1+G34), AAG/(G34+T4), BFL/(G23+T3), ALT/AAG, ALT/(T2+T3), G23/T4, T1/T4 and EFL/AAG of the present embodiment.

In comparison with the fourth embodiment, Fno in the seventh embodiment may be larger.

Figure 34:
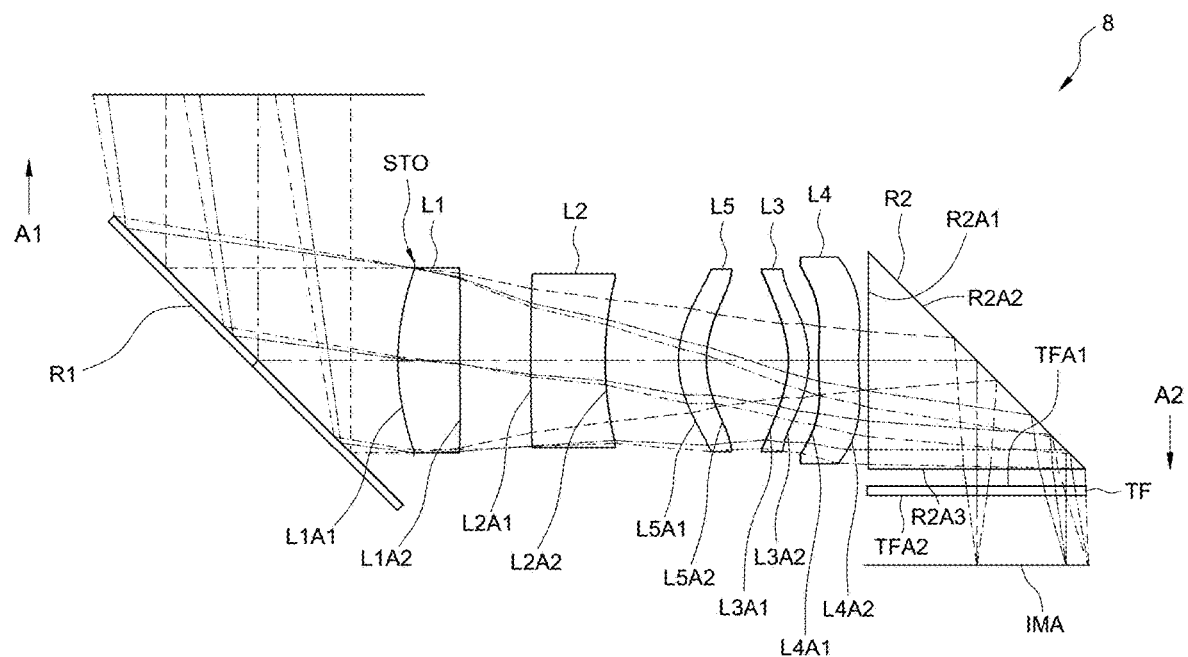
FIG. 34 depicts a cross-sectional view of the optical imaging lens according to the eighth embodiment of the present disclosure.
Figure 35:
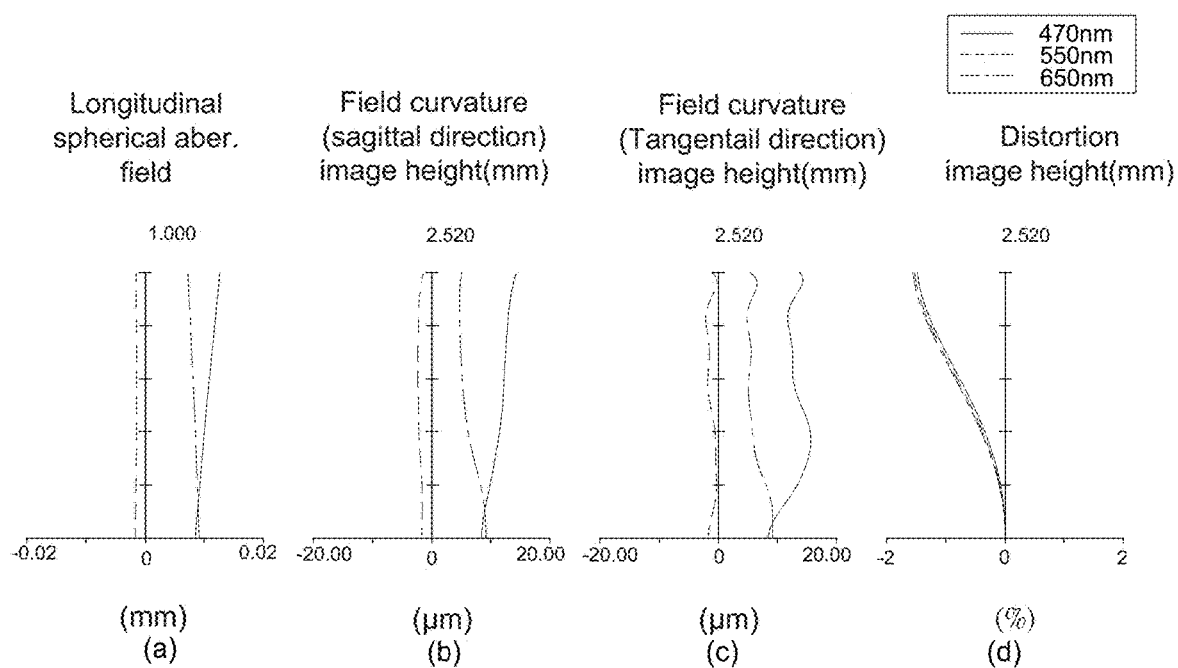
FIG. 35 depicts a chart of a longitudinal spherical aberration and other kinds of optical aberrations of the optical imaging lens according to the eighth embodiment of the present disclosure.

Reference is now made to FIGS. 34-37. FIG. 34 illustrates an example cross-sectional view of an optical imaging lens 8 according to an eighth embodiment. FIG. 35 shows example charts of a longitudinal spherical aberration and other kinds of optical aberrations of the optical imaging lens 8 according to the eighth embodiment. FIG. 36 shows an example table of optical data of each lens element of the optical imaging lens 8 according to the eighth embodiment. FIG. 37 shows an example table of aspherical data of the optical imaging lens 8 according to the eighth embodiment.

As shown in FIG. 34, the optical imaging lens 8 of the present embodiment, in an order from an object side A1 to an image side A2 along an optical axis, may comprise first reflective element R1, an aperture stop STO, a first lens element L1, a second lens element L2, a fifth lens element L5, a third lens element L3, a fourth lens element L4, and a second reflective element R2.

The arrangement of the convex or concave surface structures, including the object-side surfaces L1A1, L2A1, L5A1, L3A1, and L4A1 and the image-side surfaces L1A2, L2A2, L5A2, L3A2, and L4A2 may be generally similar to the optical imaging lens 4, but the differences between the optical imaging lens 4 and the optical imaging lens 8 may include the refracting power of the fourth lens element L4, a radius of curvature, a thickness, aspherical data, and/or an effective focal length of each lens element. More specifically, the fourth lens element L4 may have positive refracting power.

Here, in the interest of clearly showing the drawings of the present embodiment, only the surface shapes which are different from that in the fourth embodiment may be labeled. Please refer to FIG. 36 for the optical characteristics of each lens element in the optical imaging lens 8 of the present embodiment.

From the vertical deviation of each curve shown in FIG. 35(a), the offset of the off-axis light relative to the image point may be within about ±0.014 mm. Referring to FIG. 35(b), the focus variation with respect to the three different wavelengths (470 nm, 555 nm and 650 nm) in the whole field may fall within about ±14 μm. Referring to FIG. 35(c), the focus variation with respect to the three different wavelengths (470 nm, 555 nm and 650 nm) in the whole field may fall within about ±16 μm. Referring to FIG. 35(d), the variation of the distortion aberration of the optical imaging lens 8 may be within about ±1.8%.

Please refer to FIG. 46B for the values of T1, G12, T2, G25, T5, G53, T3, G34, T4, G4F, TTF, GFP, TTL, G23, BFL, EFL, TL, ALT, AAG, ImgH, TTL/TL, EFL/ImgH, ALT/(T1+G12), AAG/(T3+T4), BFL/(T1+T4), EFL/BFL, BFL/(T1+T2+T3), AAG/(T2+T3), T4/T2, TL/(G12+G23), AAG/(T1+G34), AAG/(G34+T4), BFL/(G23+T3), ALT/AAG, ALT/(T2+T3), G23/T4, T1/T4 and EFL/AAG of the present embodiment.

In comparison with the fourth embodiment, Fno in the eighth embodiment may be larger.

Figure 38:
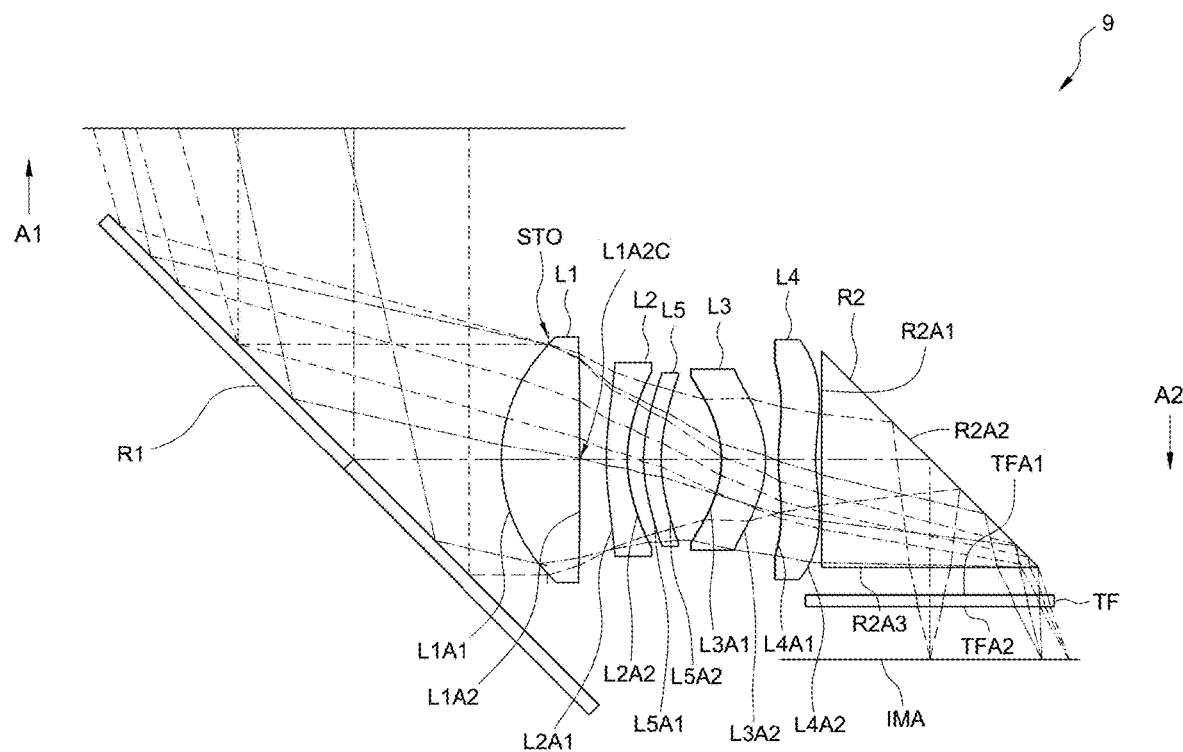
FIG. 38 depicts a cross-sectional view of the optical imaging lens according to the ninth embodiment of the present disclosure.
Figure 39:
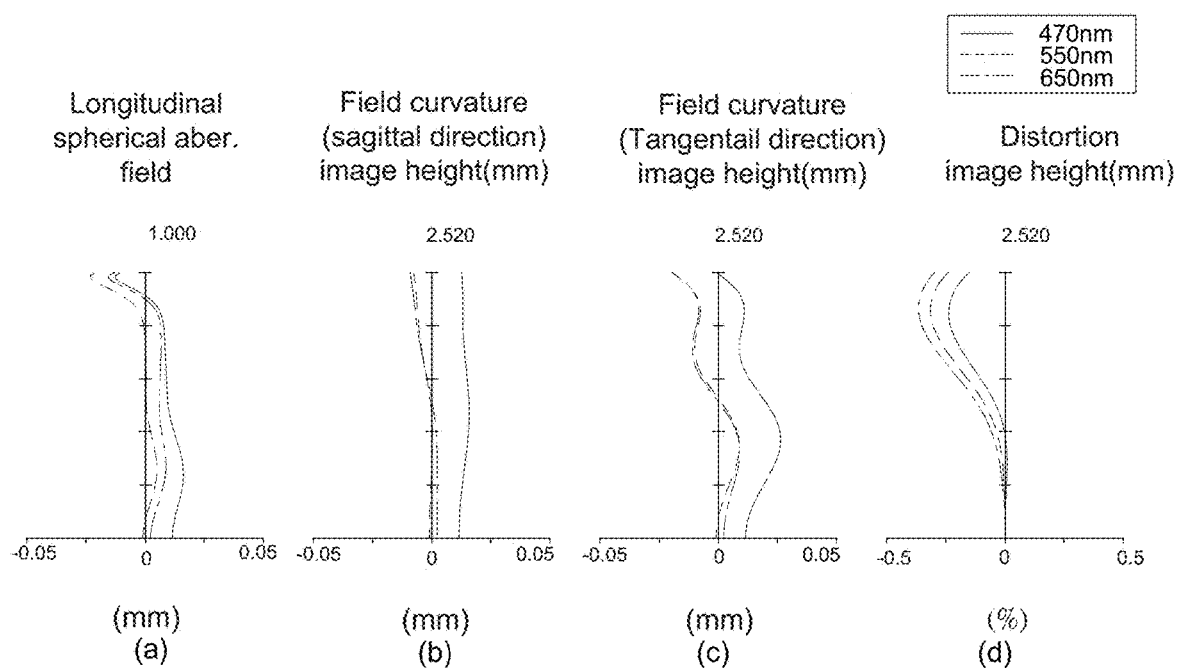
FIG. 39 depicts a chart of a longitudinal spherical aberration and other kinds of optical aberrations of the optical imaging lens according to the ninth embodiment of the present disclosure.

Reference is now made to FIGS. 38-41. FIG. 38 illustrates an example cross-sectional view of an optical imaging lens 9 according to a ninth example embodiment. FIG. 39 shows example charts of a longitudinal spherical aberration and other kinds of optical aberrations of the optical imaging lens 9 according to the ninth example embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment.

As shown in FIG. 38, the optical imaging lens 9 of the present embodiment, in an order from an object side A1 to an image side A2 along an optical axis, may comprise a first reflective element R1, an aperture stop STO, a first lens element L1, a second lens element L2, a fifth lens element L5, a third lens element L3, a fourth lens element L4, and a second reflective element R2.

The arrangement of the convex or concave surface structures, including the object-side surfaces L1A1, L2A1, L5A1, L3A1, and L4A1 and the image-side surfaces L2A2, L5A2, L3A2, and L4A2 may be generally similar to the optical imaging lens 4, but the differences between the optical imaging lens 4 and the optical imaging lens 9 may include the concave or concave surface structures of the image-side surface L1A2, the refracting power of the third lens element L3 and the fourth lens element L4, a radius of curvature, a thickness, aspherical data, and/or an effective focal length of each lens element. More specifically, the optical axis region L1A2C of the image-side surface L1A2 of the first lens element L1 may be convex, the third lens element L3 may have positive refracting power, and the fourth lens element L4 may have positive refracting power.

Here, in the interest of clearly showing the drawings of the present embodiment, only the surface shapes which are different from that in the fourth embodiment may be labeled. Please refer to FIG. 40 for the optical characteristics of each lens element in the optical imaging lens 9 of the present embodiment.

From the vertical deviation of each curve shown in FIG. 39(a), the offset of the off-axis light relative to the image point may be within about ±0.025 mm. Referring to FIG. 39(b), the focus variation with respect to the three different wavelengths (470 nm, 555 nm and 650 nm) in the whole field may fall within about ±0.02 mm. Referring to FIG. 39(c), the focus variation with respect to the three different wavelengths (470 nm, 555 nm and 650 nm) in the whole field may fall within about +0.03 mm. Referring to FIG. 39(d), the variation of the distortion aberration of the optical imaging lens 9 may be within about ±0.4%.

Please refer to FIG. 46B for the values of T1, G12, T2, G25, T5, G53, T3, G34, T4, G4F, TTF, GFP, TTL, G23, BFL, EFL, TL, ALT, AAG, ImgH, TTL/TL, EFL/ImgH, ALT/(T1+G12), AAG/(T3+T4), BFL/(T1+T4), EFL/BFL, BFL/(T1+T2+T3), AAG/(T2+T3), T4/T2, TL/(G12+G23), AAG/(T1+G34), AAG/(G34+T4), BFL/(G23+T3), ALT/AAG, ALT/(T2+T3), G23/T4, T1/T4 and EFL/AAG of the present embodiment.

In comparison with the fourth embodiment, the effective focal length and TTL of the optical imaging lens 9 in the ninth embodiment may be shorter, the distortion aberration may be smaller, the half field of view in the ninth embodiment may be larger, and Fno of the optical image lens 9 may be smaller.

Figure 42:
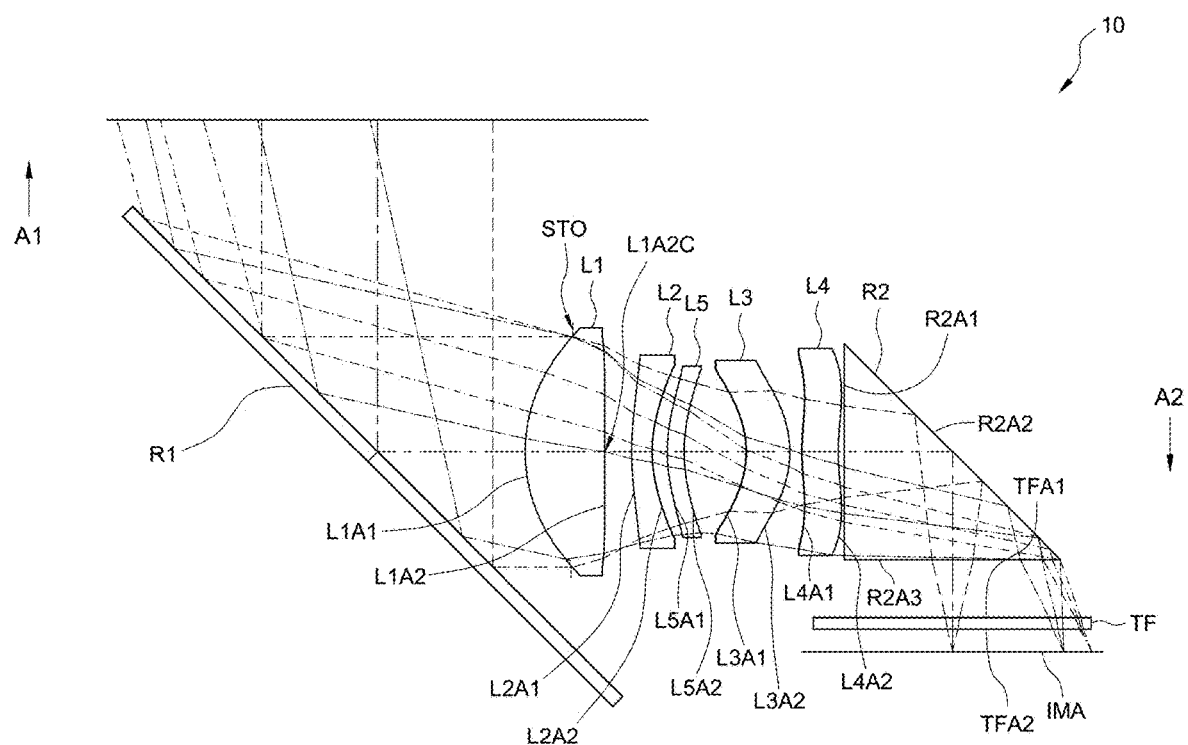
FIG. 42 depicts a cross-sectional view of the optical imaging lens according to the tenth embodiment of the present disclosure.
Figure 43:
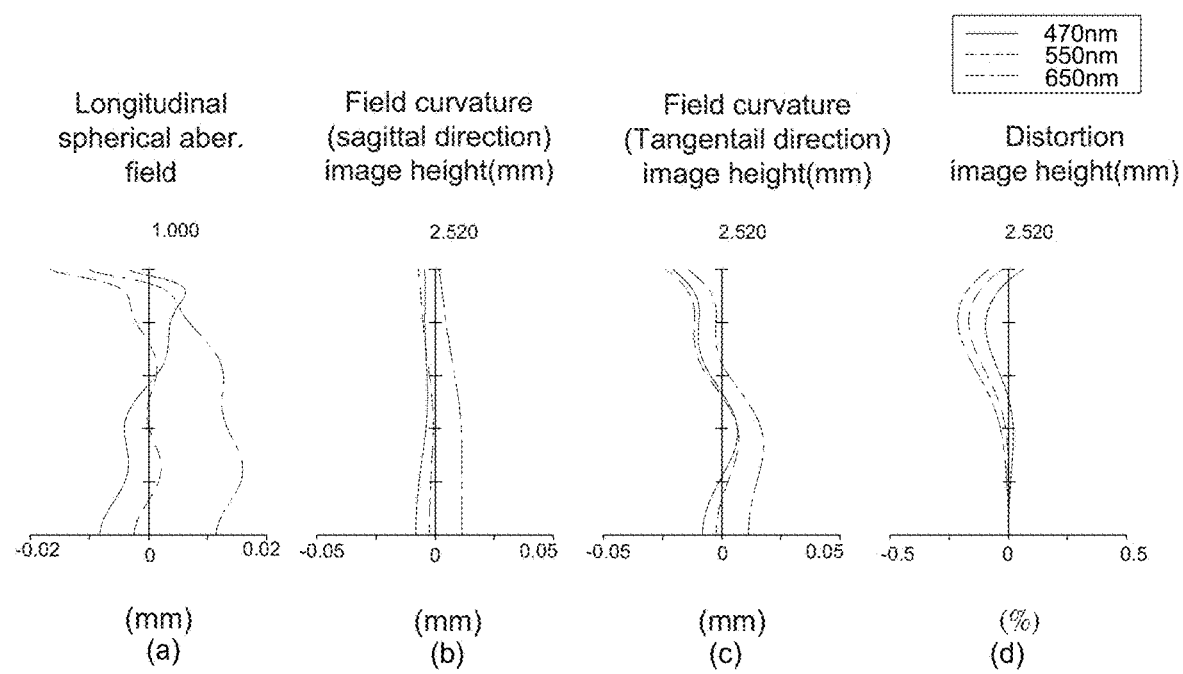
FIG. 43 depicts a chart of a longitudinal spherical aberration and other kinds of optical aberrations of the optical imaging lens according to the tenth embodiment of the present disclosure.

Reference is now made to FIGS. 42-45. FIG. 42 illustrates an example cross-sectional view of an optical imaging lens 10 according to a tenth embodiment. FIG. 43 shows example charts of a longitudinal spherical aberration and other kinds of optical aberrations of the optical imaging lens 10 according to the tenth embodiment. FIG. 44 shows an example table of optical data of each lens element of the optical imaging lens 10 according to the tenth embodiment. FIG. 45 shows an example table of aspherical data of the optical imaging lens 10 according to the tenth embodiment.

As shown in FIG. 42, the optical imaging lens 10 of the present embodiment, in an order from an object side A1 to an image side A2 along an optical axis, may comprise a first reflective element R1, an aperture stop STO, a first lens element L1, a second lens element L2, a fifth lens element L5, a third lens element L3, a fourth lens element L4, and a second reflective element R2.

The arrangement of the convex or concave surface structures, including the object-side surfaces L1A1, L2A1, L5A1, L3A1, and L4A1 and the image-side surfaces L2A2, L5A2, L3A2, and L4A2 may be generally similar to the optical imaging lens 4, but the differences between the optical imaging lens 4 and the optical imaging lens 10 may include the concave or concave surface structures of the image-side surface L1A2, the refracting power of the third lens element L3 and the fourth lens element L4, a radius of curvature, a thickness, aspherical data, and/or an effective focal length of each lens element. More specifically, the optical axis region L1A2C of the image-side surface L1A2 of the first lens element L1 may be convex, the third lens element L3 may have positive refracting power, and the fourth lens element L4 may have positive refracting power.

Here, in the interest of clearly showing the drawings of the present embodiment, only the surface shapes which are different from that in the fourth embodiment may be labeled. Please refer to FIG. 44 for the optical characteristics of each lens element in the optical imaging lens 10 of the present embodiment.

From the vertical deviation of each curve shown in FIG. 43(a), the offset of the off-axis light relative to the image point may be within about ±0.018 mm. Referring to FIG. 43(b), the focus variation with respect to the three different wavelengths (470 nm, 555 nm and 650 nm) in the whole field may fall within about ±0.015 mm. Referring to FIG. 43(c), the focus variation with respect to the three different wavelengths (470 nm, 555 nm and 650 nm) in the whole field may fall within about ±0.025 mm. Referring to FIG. 43(d), the variation of the distortion aberration of the optical imaging lens 10 may be within about ±0.25%.

Please refer to FIG. 46B for the values of T1, G12, T2, G25, T5, G53, T3, G34, T4, G4F, TTF, GFP, TTL, G23, BFL, EFL, TL, ALT, AAG, ImgH, TTL/TL, EFL/ImgH, ALT/(T1+G12), AAG/(T3+T4), BFL/(T1+T4), EFL/BFL, BFL/(T1+T2+T3), AAG/(T2+T3), T4/T2, TL/(G12+G23), AAG/(T1+G34), AAG/(G34+T4), BFL/(G23+T3), ALT/AAG, ALT/(T2+T3), G23/T4, T1/T4 and EFL/AAG of the present embodiment.

In comparison with the fourth embodiment, the effective focal length and TTL of the optical imaging lens 10 in the tenth embodiment may be shorter, the field curvature aberration in the sagittal direction and the distortion aberration may be smaller, the half field of view in the ninth embodiment may be larger, and Fno of the optical image lens 10 may be smaller.

Please refer to FIG. 46A and FIG. 46B which may be clear that the optical imaging lenses of any one of the tenth embodiments may satisfy the Equations (1)-(18).

The optical imaging lens in each embodiment of the present disclosure with the arrangements of the convex or concave surface structures described below may advantageously improve the imaging quality: the periphery region of the object-side surface of the second lens element may be convex; the optical axis region of the object-side surface of the third lens element may be concave; the periphery region of the image-side surface of the third lens element may be convex; the periphery region of the object-side surface of the fourth lens element may be concave; the optical axis region of the image-side surface of the fourth lens element may be concave; the second lens element may be arranged to be a lens element having refracting power in a second order from the object side to the image side along the optical axis; the third lens element may be arranged to be a lens element having refracting power in a second order from the image side to the object side along the optical axis; and the fourth lens element may be arranged to be a lens element having refracting power in a first order from the image side to the object side along the optical axis. The arrangement may advantageously adjust longitudinal spherical aberrations and field curvature aberration, and reduce the distortion aberration.

Any one of the aforementioned inequalities may be selectively incorporated in other inequalities to apply to the present embodiments, and as such are not limiting.

The range of values within the maximum and minimum values derived from the combined ratios of the optical parameters can be implemented according to the above mentioned embodiments.

According to above disclosure, the longitudinal spherical aberration, the field curvature aberration and the variation of the distortion aberration of each embodiment may meet the use requirements of various electronic products which implement an optical imaging lens. Moreover, the off-axis light with respect to 470 nm, 555 nm and 650 nm wavelengths may be focused around an image point, and the offset of the off-axis light for each curve relative to the image point may be controlled to effectively inhibit the longitudinal spherical aberration, the field curvature aberration and/or the variation of the distortion aberration. Further, as shown by the imaging quality data provided for each embodiment, the distance between the 470 nm, 555 nm and 650 nm wavelengths may indicate that focusing ability and inhibiting ability for dispersion may be provided for different wavelengths.

In consideration of the non-predictability of the optical lens assembly, while the optical lens assembly may satisfy any one of inequalities described above, the optical lens assembly herein according to the disclosure may achieve a shortened length and smaller spherical aberration, field curvature aberration, and/or distortion aberration, increase an imaging quality and/or assembly yield, and/or effectively improve drawbacks of a typical optical lens assembly.

While various embodiments in accordance with the disclosed principles are described above, it should be understood that they are presented by way of example only, and are not limited. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens comprising a first lens element, a second lens element, a third lens element and a fourth lens element sequentially from an object side to an image side along an optical axis, each of the first, second, third and fourth lens elements having an object-side surface facing toward the object side along an optical axis and allowing imaging rays to pass through as well as an image-side surface facing toward the image side along an optical axis and allowing the imaging rays to pass through, wherein:
   the first lens element is arranged to be a lens element having refracting power in a first order from the object side to the image side along the optical axis;
   the second lens element is arranged to be a lens element having refracting power in a second order from the object side to the image side along the optical axis;
   a periphery region of the object-side surface of the second lens element is convex;
   the third lens element is arranged to be a lens element having refracting power in a second order from the image side to the object side along the optical axis;
   an optical axis region of the object-side surface of the third lens element is concave;
   a periphery region of the image-side surface of the third lens element is convex;
   the fourth lens element is arranged to be a lens element having refracting power in a first order from the image side to the object side along the optical axis;
   a periphery region of the object-side surface of the fourth lens element is concave;
   an optical axis region of the image-side surface of the fourth lens element is concave;
   a distance from the object-side surface of the first lens element to an image plane along the optical axis is represented by TTL;
   a distance from the object-side surface of the first lens element to the image-side surface of the fourth lens element along the optical axis is represented by TL;
   an effective focal length of the optical imaging lens is represented by EFL;
   an image height of the optical imaging lens is represented by ImgH; and
   the optical imaging lens satisfies inequalities: TTL/TL$\geq$1.700 and EFL/ImgH$\geq$2.500.

2. The optical imaging lens according to claim 1, wherein a sum of thicknesses of all lens elements having refracting power along the optical axis is represented by ALT, a thickness of the first lens element along the optical axis is represented by T1, a distance from the image-side surface of the first lens element to the object-side surface of the second lens element along the optical axis is represented by G12, and the optical imaging lens further satisfies an inequality: ALT/(T1+G12)$\leq$2.700.

3. The optical imaging lens according to claim 1, wherein a sum of air gaps among all lens elements having refracting power along the optical axis is represented by AAG, a thickness of the third lens element along the optical axis is represented by T3, a thickness of the fourth lens element along the optical axis is represented by T4, and the optical imaging lens further satisfies an inequality: AAG/(T3+T4)$\geq$1.000.

4. The optical imaging lens according to claim 1, wherein a distance from the image-side surface of the fourth lens element to the image plane along the optical axis is represented by BFL, a thickness of the first lens element along the optical axis is represented by T1, a thickness of the fourth lens element along the optical axis is represented by T4, and the optical imaging lens further satisfies an inequality: BFL/(T1+T4)$\geq$2.100.

5. The optical imaging lens according to claim 1, wherein a distance from the image-side surface of the fourth lens element to the image plane along the optical axis is represented by BFL, and the optical imaging lens further satisfies an inequality: EFL/BFL$\leq$2.300.

6. The optical imaging lens according to claim 1, wherein a distance from the image-side surface of the fourth lens element to the image plane along the optical axis is represented by BFL, a thickness of the first lens element along the optical axis is represented by T1, a thickness of the second lens element along the optical axis is represented by T2, a thickness of the third lens element along the optical axis is represented by T3, and the optical imaging lens further satisfies an inequality: BFL/(T1+T2+T3)$\geq$1.800.

7. The optical imaging lens according to claim 1, wherein a sum of air gaps among all lens elements having refracting power along the optical axis is represented by AAG, a thickness of the second lens element along the optical axis is represented by T2, a thickness of the third lens element along the optical axis is represented by T3, and the optical imaging lens further satisfies an inequality: AAG/(T2+T3)$\geq$1.400.

8. The optical imaging lens according to claim 1, wherein a thickness of the second lens element along the optical axis is represented by T2, a thickness of the fourth lens element along the optical axis is represented by T4, and the optical imaging lens further satisfies an inequality: T4/T2$\leq$2.000.

9. The optical imaging lens according to claim 1, wherein a distance from the image-side surface of the first lens element to the object-side surface of the second lens element along the optical axis is represented by G12, a distance from the image-side surface of the second lens element to the object-side surface of the third lens element along the optical axis is represented by G23, and the optical imaging lens further satisfies an inequality: TL/(G12+G23)$\leq$3.200.

10. The optical imaging lens according to claim 1, wherein a sum of air gaps among all lens elements having refracting power along the optical axis is represented by AAG, a thickness of the first lens element along the optical axis is represented by T1, a distance from the image-side surface of the third lens element to the object-side surface of the fourth lens element along the optical axis is represented by G34, and the optical imaging lens further satisfies an inequality: AAG/(T1+G34)$\geq$1.000.

11. The optical imaging lens according to claim 1, wherein a sum of air gaps among all lens elements having refracting power along the optical axis is represented by AAG, a thickness of the fourth lens element along the optical axis is represented by T4, a distance from the image-side surface of the third lens element to the object-side surface of the fourth lens element along the optical axis is represented by G34, and the optical imaging lens further satisfies an inequality: AAG/(G34+T4)$\geq$2.100.

12. The optical imaging lens according to claim 1, wherein a distance from the image-side surface of the fourth lens element to the image plane along the optical axis is represented by BFL, a thickness of the third lens element along the optical axis is represented by T3, a distance from the image-side surface of the second lens element to the object-side surface of the third lens element along the optical axis is represented by G23, and the optical imaging lens further satisfies an inequality: BFL/(G23+T3)$\geq$1.400.

13. The optical imaging lens according to claim 1, wherein a sum of thicknesses of all lens elements having refracting power along the optical axis is represented by ALT, a sum of air gaps among all lens elements having refracting power along the optical axis is represented by AAG, and the optical imaging lens further satisfies an inequality: ALT/AAG≤2.100.

14. The optical imaging lens according to claim 1, further comprising at least one reflective element.

15. The optical imaging lens according to claim 14, wherein the reflective element is disposed between the fourth lens element and the image plane or between the object side and the first lens element.

16. The optical imaging lens according to claim 14, wherein one of the two reflective elements is disposed between the object side and the first lens element, another of the two reflective elements is disposed between the fourth lens element and the image plane.

17. The optical imaging lens according to claim 1, wherein a sum of thicknesses of all lens elements having refracting power along the optical axis is represented by ALT, a thickness of the second lens element along the optical axis is represented by T2, a thickness of the third lens element along the optical axis is represented by T3, and the optical imaging lens further satisfies an inequality: ALT/(T2+T3)≤3.800.

18. The optical imaging lens according to claim 1, wherein a distance from the image-side surface of the second lens element to the object-side surface of the third lens element along the optical axis is represented by G23, a thickness of the fourth lens element along the optical axis is represented by T4, and the optical imaging lens further satisfies an inequality: G23/T4≤6.100.

19. The optical imaging lens according to claim 1, wherein a thickness of the first lens element along the optical axis is represented by T1, a thickness of the fourth lens element along the optical axis is represented by T4, and the optical imaging lens further satisfies an inequality: T1/T4≥1.200.

20. The optical imaging lens according to claim 1, wherein a sum of air gaps among all lens elements having refracting power along the optical axis is represented by AAG, and the optical imaging lens further satisfies an inequality: EFL/AAG≤5.600.

* * * * *